US010055686B2

United States Patent
Huang et al.

(10) Patent No.: US 10,055,686 B2
(45) Date of Patent: Aug. 21, 2018

(54) DIMENSIONALLY REDUCTION OF LINGUISTICS INFORMATION

(71) Applicant: Microsoft Technology Licensing, LLC, Redmond, WA (US)

(72) Inventors: Po-Sen Huang, Champaign, IL (US);
Xiaodong He, Issaquah, WA (US);
Jianfeng Gao, Woodinville, WA (US);
Li Deng, Redmond, WA (US);
Alejandro Acero, Bellevue, WA (US);
Larry P. Heck, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/207,896

(22) Filed: Jul. 12, 2016

(65) Prior Publication Data

US 2016/0321321 A1 Nov. 3, 2016

Related U.S. Application Data

(63) Continuation of application No. 14/019,563, filed on Sep. 6, 2013, now Pat. No. 9,519,859.

(51) Int. Cl.
*G06N 3/08* (2006.01)
*G06N 3/04* (2006.01)
(Continued)

(52) U.S. Cl.
CPC ............. *G06N 3/084* (2013.01); *G06F 17/28* (2013.01); *G06F 17/30401* (2013.01);
(Continued)

(58) Field of Classification Search
None
See application file for complete search history.

(56) References Cited

U.S. PATENT DOCUMENTS 6,701,318 B2 3/2004 Fox et al.
7,542,969 B1 6/2009 Rappaport et al.
(Continued)

FOREIGN PATENT DOCUMENTS

CN 102419778 A 4/2012
WO 2013121181 A1 8/2013

OTHER PUBLICATIONS

Shafiei et al., "Document Representation and Dimension Reduction for Text Clustering", 2007, IEEE, pp. 770-779.*
(Continued)

*Primary Examiner* — Paulinho E Smith
(74) *Attorney, Agent, or Firm* — Rainier Patents, P.S.

(57) ABSTRACT

A deep structured semantic module (DSSM) is described herein which uses a model that is discriminatively trained based on click-through data, e.g., such that a conditional likelihood of clicked documents, given respective queries, is maximized, and a condition likelihood of non-clicked documents, given the queries, is reduced. In operation, after training is complete, the DSSM maps an input item into an output item expressed in a semantic space, using the trained model. To facilitate training and runtime operation, a dimensionality-reduction module (DRM) can reduce the dimensionality of the input item that is fed to the DSSM. A search engine may use the above-summarized functionality to convert a query and a plurality of documents into the common semantic space, and then determine the similarity between the query and documents in the semantic space. The search engine may then rank the documents based, at least in part, on the similarity measures.

20 Claims, 13 Drawing Sheets

(51) Int. Cl.
*G06F 17/30* (2006.01)
*G06F 17/28* (2006.01)

(52) U.S. Cl.
CPC .. *G06F 17/30657* (2013.01); *G06F 17/30731* (2013.01); *G06F 17/30864* (2013.01); *G06N 3/0454* (2013.01)

(56) References Cited

U.S. PATENT DOCUMENTS

| | | | |
|---|---|---|---|
| 7,685,084 | B2 | 3/2010 | Sisk et al. |
| 7,716,216 | B1 | 5/2010 | Harik et al. |
| 7,818,279 | B2 | 10/2010 | Liu et al. |
| 7,840,569 | B2 | 11/2010 | Meyerzon et al. |
| 7,895,235 | B2 | 2/2011 | Baeza-Yates et al. |
| 8,055,669 | B1 | 11/2011 | Singhal et al. |
| 8,229,948 | B1 | 7/2012 | Ershov |
| 8,266,144 | B2 | 9/2012 | Tankovich et al. |
| 8,321,431 | B2 | 11/2012 | Quick et al. |
| 8,359,282 | B2 | 1/2013 | Bai et al. |
| 8,392,436 | B2 | 3/2013 | Bai et al. |
| 8,463,595 | B1* | 6/2013 | Rehling ............ G06F 17/30864 704/9 |
| 8,504,361 | B2 | 8/2013 | Collobert et al. |
| 8,533,188 | B2 | 9/2013 | Yan et al. |
| 8,606,786 | B2 | 12/2013 | Rounthwaite et al. |
| 8,751,238 | B2 | 6/2014 | James et al. |
| 8,775,442 | B2 | 7/2014 | Moore et al. |
| 9,047,283 | B1 | 6/2015 | Zhang et al. |
| 9,519,859 | B2 | 12/2016 | Huang et al. |
| 2002/0129015 | A1 | 9/2002 | Caudill et al. |
| 2004/0260695 | A1 | 12/2004 | Brill |
| 2005/0004905 | A1 | 1/2005 | Dresden |
| 2005/0278362 | A1 | 12/2005 | Maren et al. |
| 2006/0026013 | A1 | 2/2006 | Kraft |
| 2006/0277033 | A1 | 12/2006 | Gao |
| 2007/0124263 | A1 | 5/2007 | Katariya et al. |
| 2007/0136281 | A1 | 6/2007 | Li et al. |
| 2007/0203869 | A1 | 8/2007 | Ramsey et al. |
| 2008/0140644 | A1 | 6/2008 | Franks et al. |
| 2008/0243820 | A1 | 10/2008 | Chang et al. |
| 2009/0019034 | A1 | 1/2009 | Franks et al. |
| 2009/0125501 | A1 | 5/2009 | Gao et al. |
| 2009/0259651 | A1 | 10/2009 | Tankovich et al. |
| 2009/0276414 | A1 | 11/2009 | Gao et al. |
| 2009/0282022 | A1 | 11/2009 | Bennett |
| 2010/0153315 | A1 | 6/2010 | Gao et al. |
| 2010/0161641 | A1 | 6/2010 | Gustafson et al. |
| 2010/0250547 | A1 | 9/2010 | Grefenstette et al. |
| 2010/0318531 | A1 | 12/2010 | Gao et al. |
| 2011/0040752 | A1 | 2/2011 | Svore et al. |
| 2011/0208709 | A1 | 8/2011 | Holthausen |
| 2011/0208735 | A1 | 8/2011 | Gao et al. |
| 2011/0270604 | A1 | 11/2011 | Qi et al. |
| 2011/0276390 | A1 | 11/2011 | Li et al. |
| 2011/0276599 | A1 | 11/2011 | Connor |
| 2012/0005219 | A1 | 1/2012 | Apacible et al. |
| 2012/0036015 | A1 | 2/2012 | Sheikh |
| 2012/0078825 | A1 | 3/2012 | Kulkarni et al. |
| 2012/0158621 | A1 | 6/2012 | Bennett et al. |
| 2012/0203717 | A1* | 8/2012 | Xu ........................ G06N 99/005 706/12 |
| 2012/0233140 | A1 | 9/2012 | Collins-Thompson et al. |
| 2012/0233160 | A1 | 9/2012 | Koomullil et al. |
| 2012/0253792 | A1* | 10/2012 | Bespalov .......... G06F 17/30707 704/9 |
| 2012/0254217 | A1 | 10/2012 | Ali et al. |
| 2012/0254218 | A1 | 10/2012 | Ali et al. |
| 2012/0317087 | A1 | 12/2012 | Lymberopoulos et al. |
| 2012/0317088 | A1 | 12/2012 | Pantel et al. |
| 2013/0103493 | A1 | 4/2013 | Gao et al. |
| 2013/0124492 | A1 | 5/2013 | Gao et al. |
| 2013/0159320 | A1* | 6/2013 | Gao .................. G06F 17/30867 707/748 |
| 2013/0166303 | A1 | 6/2013 | Chang et al. |
| 2013/0121181 | A1 | 8/2013 | Driscoll et al. |
| 2013/0239006 | A1 | 9/2013 | Tolkachev |
| 2014/0279773 | A1 | 9/2014 | Chen et al. |
| 2015/0074027 | A1 | 3/2015 | He et al. |
| 2015/0278200 | A1 | 10/2015 | He et al. |
| 2015/0293976 | A1 | 10/2015 | Guo et al. |
| 2016/0042296 | A1 | 2/2016 | Shan et al. |

OTHER PUBLICATIONS

Bendersky et al., "Parameterized Concept Weighting in Verbose Queries," SIGIR'11, Jul. 24-28, 2011, Beijing, China, 10 pages.
Deng et al., "Deep Stacking Networks for Information Retrieval," IEEE International Conference on Acoustics, Speech, and Signal Processing (ICASSP), 2013, 5 pages.
Gao et al., "Learning Continuous Phrase Representations for Translation Modeling," ACL, 2014, 11 pages.
Gao et al., "Modeling Interestingness with Deep Neural Networks," EMNLP, Oct. 25-29, 2014, Doha, Qatar, 12 pages.
Hutchinson et al., "Tensor Deep Stacking Networks," IEEE Transactions on Pattern Analysis and Machine Intelligence, vol. 35, No. 8, Aug. 2013, 14 pages.
Lavrenko, Victor and W. Bruce Croft, "Relevance-Based Language Models," SIGIR '01, Sep. 9-12, 2001, New Orleans, Louisiana, 8 pages.
LV, Yuanhua and ChengXiang Zhai, "Positional Language Models for Information Retrieval," SIGIR '09, Jul. 19-23, 2009, Boston, MA, 8 pages.
Metzler, Donald and W. Bruce Croft, "Latent Concept Expansion Using Markov Random Fields," SIGIR '07, Jul. 23-27, 2007, Amsterdam, The Netherlands, 8 pages.
Mnih, Andriy and Koray Kavukcuoglu, "Learning word embeddings efficiently with noise-contrastive estimation," retrieved at <<papers.nips.cc/paper/5165-learning-word-embeddings-efficiently-with-noise-contrastive-estimation.pdf>>, NIPS, 9 pages.
Shen et al., "A Latent Semantic Model with Convolutional-Pooling Structure for Informational Retrieval," CIKM'14, Nov. 3-7, 2014, Shanghai, China, 10 pages.
Shen et al., "Learning Semantic Representations Using Convolutional Neural Networks for Web Search," WWW'14 Companion, Apr. 7-11, 2014, Seoul, Korea, 2 pages.
Non-Final Office Action and Examiner-Initiated Interview Summary dated Mar. 7, 2016 from U.S. Appl. No. 14/242,845, 31 pages.
Non-Final Office Action dated Feb. 26, 2016 from U.S. Appl. No. 14/242,703, 28 pages.
PCT Chapter II Demand and Response filed Oct. 30, 2015 from PCT Patent Application No. PCT/US2015/024417, 21 pages.
Zhao et al., "Time-Dependent Semantic Similarity Measure of Queries Using Historical Click-Through Data", International World Wide Web Conference Committee, ACM, May 23-26, 2006, Edinburgh, Scotland, 10 pages.
Chein, Steve and Nicole Immorlica, "Semantic Similarity Between Search Engine Queries Using Temporal Correlation", Proceedings of the 14th International Conference on World Wide Web, ACM, May 10-14, 2005, Chiba, Japan, 10 pages.
Lai et al., "Developing a Fuzzy Search Engine Based on Fuzzy Ontology and Semantic Search", 2011 IEEE International Conference on Fuzzy Systems, Jun. 27-30, 2011, Taipei, Taiwan, pp. 2684-2689, 6 pages.
Pan et al., "Image Search by Graph-based Label Propagation with Image Representation from DNN", Proceedings of be 21st ACM International Conference on Multimedia, Oct. 21-25, 2013, Barcelona, Spain, 4 pages.
Shabanzadeh et al., "A Semantic Based Query Expansion to Search", Proceedings of the International Conference on Intelligent Control and Information Processing, Aug. 2010, 11 pages.
Joachims et al., "Accurately Interpreting Clickthrough Data as Implicit Feedback", Proceedings of the 28th Annual International ACM SIGIR Conference on Research and Development in Informational Retrieval, Aug. 15-19, 2005, Salvador, Brazil, 8 pages.
Wang, et al., "Explore Click Models for Search Ranking," retrieved at <<http://www.cs.berkeley.edu/~yuczhang/files/cikm10_ranking.

(56) References Cited

OTHER PUBLICATIONS pdf>>, Proceedings of the 19th ACM International Conference on Information and Knowledge Management, Oct. 2010, pp. 1417-1420, 4 pages.

"Researchers Predict Click-through Behavior in Web Searches," retrieved at <<http://news.psu.edu/story/178742/2009/03/11/researchers-predict-click-through-behavior-web-searches>>, Penn State News, Mar. 11, 2009, 2 pages.

Bengio, Yoshua, "Learning Deep Architectures for AI," retrieved at <<http://www.iro.umontreal.ca/~bengioy/papers/ftml_book.pdf>>, Foundations and Trends in Machine Learning, vol. 2, Issue 1, 2009, 130 pages.

Blei, et al., "Latent Dirichlet Allocation," retrieved at <<http://acm.org>>, Journal of Machine Learning Research, vol. 3, Mar. 2003, pp. 993-1022, 30 pages.

Brown, et al., "The Mathematics of Statistical Machine Translation: Parameter Estimation," retrieved at <<http://acm.org>>, Computational Linguistics, vol. 19, Issue 2, Jun. 1993, pp. 263-311, 50 pages.

Burges, et al., "Learning to Rank using Gradient Descent," retrieved at <<http://acm.org>>, Proceedings of the 22nd International Conference on Machine Learning, 2005, pp. 89-96, 8 pages.

Collobert, et al., "Natural Language Processing (Almost) from Scratch," retrieved at <<http://acm.org>>, The Journal of Machine Learning Research, vol. 12, Feb. 2011, pp. 2493-2537, 45 pages.

Dahl, et al., "Context-Dependent Pre-Trained Deep Neural Networks for Large-Vocabulary Speech Recognition," retrieved at <<http://research.microsoft.com/pubs/144412/dbn4lvcsr-transaslp.pdf>>, IEEE Transactions on Audio, Speech, and Language Processing, vol. 20, Issue 1, Jan. 2012, pp. 30-42, 13 pages.

Deerwester, et al., "Indexing by Latent Semantic Analysis," retrieved at <<http://lsa.colorado.edu/papers/JASIS.si.90.pdf>>, Journal of the American Society for Information Science, vol. 41, Issue 6, Sep. 1990, 34 pages.

Oumais, et al., "Automatic Cross-Linguistic Retrieval Using Latent Semantic Indexing," retrieved at <<http://www.aaai.org/Papers/Symposia/Spring/1997/SS-97-05/SS97-05-003.pdf>>, Proceedings of AAAI Spring Symposium Series: Cross-Language Text and Speech Retrieval, Mar. 1997, 7 pages.

Gao, et al., "Clickthrough-Based Translation Models for Web Search: from Word Models to Phrase Models," retrieved at <<http://acm.org>>, Proceedings of the 19th ACM International Conference on Information and Knowledge Management, Oct. 2010, pp. 1139-1148, 10 pages.

Gao, et al., "Clickthrough-Based Latent Semantic Models for Web Search," retrieved at <<http://acm.org>>, Proceedings of the 34th International ACM SIGIR Conference on Research and Development in Information Retrieval, Jul. 2011, pp. 675-684, 10 pages.

Gao, et al., "Smoothing Clickthrough Data for Web Search Ranking," retrieved at <<http://acm.org>>, Proceedings of the 32nd International ACM SIGIR Conference on Research and Development in Information Retrieval, Jul. 2009, pp. 355-362, 8 pages.

Girolami, et al., "On an Equivalence between PLSI and LDS," retrieved at <<http://acm.org>>, Proceedings of the 26th Annual International ACM SIGIR Conference on Research and Development in Information Retrieval, Jul. 2003, pp. 433-434, 2 pages.

Hinton, et al., "Deep Neural Networks for Acoustic Modeling in Speech Recognition," retrieved at <<http://research.microsoft.com/pubs/171498/HintonDengYuEtAl-SPM2012.pdf>>, Magazine of IEEE Signal Processing, Nov. 2012, pp. 82-97, 16 pages.

Hinton, et al., "Discovering Binary Codes for Documents by Learning Deep Generative Models," retrieved at <<http://citeseerx.ist.psu.edu/viewdoc/download?doi=10.1.1.187.4977&rep=rep1&type=pdf>>, Proceedings of Topics in cognitive Science, 2010, 18 pages.

Hofmann, Thomas, "Probabilistic Latent Semantic Indexing," retrieved at <<http://acm.org>>, Proceedings of the 22nd Annual International ACM SIGIR Conference on Research and Development in Information Retrieval, Aug. 1999, pp. 50-57, 8 pages.

Jarvelin, et al., "IR Evaluation Methods for Retrieving Highly Relevant Documents," retrieved at <<http://acm.org>>, Proceedings of the 23rd Annual International ACM SIGIR Conference on Research and Development in Information Retrieval, Jul. 2000, pp. 41-48, 8 pages.

Li, et al., "Very Sparse Random Projections," retrieved at <<http://acm.org>>, Proceedings of the 12th ACM SIGKDD International Conference on Knowledge Discovery and Data Mining, Aug. 20, 2006, pp. 287-296, 10 pages.

Platt, et al., "Translingual Document Representations from Discriminative Projections," retrieved at <<http://acm.org>>, Proceedings of the Conference on Empirical Methods in Natural Language Processing, Oct. 2010, pp. 251-261, 11 pages.

Salakhutdinov, et al., "Semantic Hashing," retrieved at <<http://research.microsoft.com/pubs/139237/translingfinal.pdf>>, IRGM Workshop at the SIGIR Conference, Jun. 2007, 8 pages.

Socher, et al., "Semantic Compositionality through Recursive Matrix-Vector Spaces," retrieved at <<http:/acm.org>>, Proceedings of the Joint Conference on Empirical Methods in Natural Language Processing and Computational Natural Language Learning, Jul. 2012, pp. 1201-1211, 11 pages.

Svore, et al., "A Machine Learning Approach for Improved BM25 Retrieval," retrieved at <<http://acm.org>>, Proceedings of the 18th ACM Conference on Information and Knowledge Management, Nov. 2009, pp. 1811-1814, 4 pages.

Wei, et al., "LDA-based Document Models for Ad-hoc Retrieval," retrieved at <<http://www.bradblock.com/LDA_Based-_Document_Models_for_Ad_hoc_Retrieval.pdf>>, Proceedings of the 29th Annual International ACM SIGIR Conference on Research and Development in Information Retrieval, Aug. 2006, pp. 178-185, 8 pages.

Yih, et al., "Learning Discriminative Projections for Text Similarity Measures," retrieved at <<http://research.microsoft.com/pubs/150018/yih%20conll-11.pdf>>, Proceedings of the Fifteenth Conference on Computational Natural Language Learning, Jun. 2011, pp. 247-256, 10 pages.

Zeiler, et al., "Adaptive Deconvolutional Networks for Mid and High Level Feature Learning," retrieved at <<http://ieeexplore.ieee.org/stamp/stamp.jsp?tp=&arnumber=6126474>>, IEEE International Conference on Computer Vision, Nov. 2011, pp. 2018-2025, 8 pages.

Konig, et al., "Nonlinear Discriminant Feature Extraction for Robust Text-Independent Speaker Recognition," retrieved at <<http://research.microsoft.com/apps/pubs/default.aspx?id=193653>>, Proceedings of the RLA2C, 1998, 4 pages.

Heck, et al., "Robustness to telephone handset distortion in speaker recognition by discriminative feature design," retrieved at <<http://research.microsoft.com/apps/pubs/default.aspx?id=193648>>, Speech Communication, vol. 31, Elsevier Science B.V., 2000, pp. 181-192, 12 pages.

Song et al., "Adapting Deep RankNet for Personalized Search," Proceedings of the 7th ACM International Conference on Web Search and Data Mining, Feb. 24, 2014, 10 pages.

Chen et al., "Small-Footprint Keyword Spoiling Using Deep Neural Networks," available at <<http:\\old-site.clsp.jhu.edu\~guguo/paper/chen2014small.pdf>>, on Mar. 3, 2014, 5 pages.

Volkovs, Maksims N., "Context Models for Web Search Personalization," available at <<http:\\www.cs.toronto.edu/~mvolkovs/yandex_kaggle_model.pdf>>, on Mar. 3, 2014, 7 pages.

Berger et al., "Information Retrieval as Statistical Translation," Proceeding of the 22nd Annual International ACM SIGIR Conference on Research and Development in Information Retrieval, 1999, 8 pages.

Deng et al., "A Deep Convolutional Neural Network Using Hetergeneous Pooling for Trading Accoustic Invariance with Phonetic Confusion," Proceedings of IEEE International Conference on Accoustics, Speech, and Signal Processing, May 2013, 5 pages.

Gao, "Dependence Language Model for Information Retrieval," Proceedings of the 27th Annual International ACM SIGIR Conference on Research and Development in Information Retrieval, 2004, 8 pages.

He et al., "Discriminative Learning in Sequential Pattern Recognition," Proceedings of IEEE Signal Processing Magazine, vol. 25, Issue 5, 2008, 23 pages.

(56) References Cited

OTHER PUBLICATIONS

Huang et al., "Learning Deep Structured Semantic Models for Web Search using Clickthrough Data," Proceedings of the 22nd ACM International Conferences on Information & Knowledge Management, Oct. 27, 2013, 6 pages.
Lu et al., "A Deep Architecture for Matching Short Texts," Proceedings of Advances in Neural Information Processing Systems, Dec. 2013, 9 pages.
Metzler et al., "A Markov Random Field Model for Term Dependencies," Proceeding of the 28th Annual International ACM SIGIR Conference on Research and Development in Information Retrieval, 2005, 8 pages.
Mikolov et al., "Linguistic Regularities in Continuous Space Word Representations," Proceedings of the 2013 conference of the North American Chapter of the Association for Computational Linguistics: Human Language Technologies, May 2013, 6 pages.
Mikolov et al., "Distributed Representations of Words and Phrases and their Compositionality," Proceedings of Advances in Neural Information Processing Systems, Oct. 16, 2013, 9 pages.
Socher et al., "Semantic Compositionality through Recursive Matrix-Vector Spaces," Proceedings of the 2013 Joint Conference on Empirical Methods in Natural Language Processing and Computational Natural Language Learning, Jul. 2012, 11 pages.
Song et al., "A General Language Model for Information Retrieval," Proceedings of the Eighth International Conference on Information and Knowledge Management, 1999, 6 pages.
Jones, Karen Sparck, "What is the Role of NLP in Text Retrieval?" Proceedings of Natural Language Information Retrieval Text, 1999, 19 pages.
Tur et al., "Towards Deeper Understanding: Deep Convex Networks for Semantic Utterance Classification," Proceedings of IEEE International Conference on Acoustics, Speech and Signal Processing, Mar. 2012, 4 pages.
Wang et al., "Multi-Style Language Model for Web Scale Information Retrieval," Proceedings of the 33rd International ACM SIGIR Conference on Research and Development in Information Retrieval, 2010, 8 pages.
Zhai et al., "A Study of Smoothing Methods for Language Models Applied to Ad Hoc Information Retrieval," Proceedings of the 24th Annual International ACM SIGIR Conference on Research and Development in Information Retrieval, 2001, 9 pages.
Mesnil et al., "Investigation of Recurrent-Neural-Network Architectures and Learning Methods for Spoken Language Understanding," Proceedings of 14th Annual Conference of the International Speech Communication Association, Aug. 25, 2013, 5 pages.
Wang et al., "Topical N-Grams: Phrase and Topic Discovery, with an Application to Information Retrieval," Proceedings of the Seventh IEEE International Conference on Data Mining, 2007 6 pages.
Maas et al., "A Probabilistic Model for Semantic Word Vectors," NIPS Workshop on Deep Learning and Unsupervised Feature Learning, 2010, 8 pages.
Yih et al., "Learning Discriminative Projections for Text Similarity Measures," Proceedings of the Fifteenth Conference on Computational Natural Language Learning, 2011, 10 pages.
Dietze, Heiko and Michael Schroeder, "GoWeb: a semantic search engine for the life science web," BMC Bioinformatics, Bio Med Central, vol. 10, No. Suppl 10, Oct. 1, 2009, 13 pages.
Gillani et al., "Semantic Schema Matching Using DBpedia," International Journal of Intelligent Systems and Applications, vol. 5, Issue 4, Mar. 2013, pp. 72-80, 9 pages.
International Search Report and Written Opinion dated Dec. 21, 2015 from PCT Patent Application No. PCT/US2015/044540, 14 pages.
Buckley et al., "Automatic Routing and Retrieval Using Smart: TREC-2," Information Processing & Management, vol. 31, No. 3, 1995, pp. 315-326, 12 pages.
Response filed Jun. 7, 2016 to the Non-Final Office action dated Mar. 7, 2016 from U.S. Appl. No. 14/242,845, 10 pages.
Response filed May 26, 2016 to the Non-Final Office action dated Feb. 26, 2016 from U.S. Appl. No. 14/252,703, 12 pages.
International Preliminary Report on Patentability dated Jun. 10, 2016 from PCT Patent Application No. PCT/US2015/024417, 20 pages.
International Search Report and Written Opinion dated Jun. 18, 2015 from PCT Patent Application No. PCT/US2015/024417, 10 pages.
Deng, Li, "Three Classes of Deep Learning Architectures and Their Applications: A tutorial Survey," 2012, APSIPA Transactions on Signal and Information Processing, pp. 1-28, 28 pages.
Lin et al., "Dimensionality Reduction by Random Projection and Latent Semantic Indexing," May 2003, Proceedings of the 3rd SIAM International Conference on Data Mining and Text Mining Workshop, pp. 1-10, 10 pages.
Cavnar et al., "N-Gram-Based Text Categorization," 1994, Proceddings of SDAIR-94, 3rd Annual Symposium on Document Analysis and Information, pp. 1-14, 14 pages.
Notice of Allowance dated Jul. 26, 2016 from U.S. Appl. No. 14/242,845, 29 pages.
Notice of Allowance dated Apr. 22, 2016 from U.S. Appl. No. 14/019,563, 9 pages.
Response filed Mar. 22, 2016 to the Non-Final Office Action dated Dec. 16, 2015 from U.S. Appl. No. 14/019,563, 11 pages.
Non-Final Office Action dated Dec. 16, 2015 from U.S. Appl. No. 14/019,563, 48 pages.
Diamantaras, et al., "Principal Component Neural Networks: Theory and Applications," Wiley-Interscience Publication, 1996, 255 pages.
Montavon et al., "Neural Networks: Tricks of the Trade," Springer Publishers, 2012, 769 pages.
Final Office Action dated Feb. 8, 2017 from U.S. Appl. No. 14/456,985, 52 pages.
Arora et al., "Semantic Searching and Ranking of Documents using Hybrid Learning System and WordNet", International Journal of Advanced Computer Science and Applications, vol. 3, No. 6, 2011, 8 pages.
International Preliminary Report on Patentability dated Feb. 23, 2017 from PCT Patent Application No. PCT/US2015/044540, 7 pages.
Second Written Opinion dated Mar. 14, 2016 from PCT Patent Application No. PCT/US2015/024417, 6 pages.
Response filed Jan. 17, 2017 to the Non-Final Office Action dated Nov. 17, 2016 from U.S. Appl. No. 14/456,985, 13 pages.
Applicant-Initiated Interview Summary and Appendix dated Apr. 20, 2017 from U.S. Appl. No. 14/456,985, 4 pages.
Response filed May 5, 2017 to the Final Office Action dated Feb. 8, 2017 from U.S. Appl. No. 14/456,985, 12 pages.
Communication pursuant to Rules 161(1) and 162 EPC dated Mar. 17, 2017 from European Patent Application No. 15754341.4, 2 pages.
Baeza-Yates et al., "Extracting Semantic Relations from Query Logs," KDD'07, Aug. 12-15, 2007, 10 pages.
Non-Final Office Action dated Nov. 17, 2016 from U.S. Appl. No. 14/456,985, 27 pages.
Notice of Allowance and Examiner-Initiated Interview Summary dated Sep. 7, 2016 from U.S. Appl. No. 14/252,703, 24 pages.
"Amendment Filed in Chinese Patent Application No. 201580043229.6", Filed Date: Sep. 1, 2017, 17 pages.

* cited by examiner

DIMENSIONALLY REDUCTION OF LINGUISTICS INFORMATION

BACKGROUND

A traditional search engine processes a query by directly comparing terms in the query with terms in documents. In some cases, however, a query and a document use different words to express the same concept. A traditional search engine may produce unsatisfactory search results in these circumstances. A search engine may augment a query by finding synonyms of the query terms and adding those synonyms to the query. But even this tactic may fail to uncover conceptual similarities between a query and a document.

To address the above drawbacks, the research community has proposed search engines which project queries and documents to a semantic space, and then match the queries to the documents in that space, rather than (or in addition to) comparing the lexical "surface" form of the queries and documents. For example, a search engine may use the well-known Latent Semantic Analysis (LSA) technique to perform the above-described kind of processing. More recently, the research community has proposed models that express deeper relationships within input information, e.g., through the use of neural networks having plural hidden layers. For example, auto-encoders leverage deep learning to project linguistic items into a semantic space. One approach trains these auto-encoders in an unsupervised manner, e.g., by generating model parameters that optimize the reconstruction of documents, that is, after those documents have been converted into a semantic space.

The above-described latent analysis techniques have, in some cases, improved the quality of search results. Yet there remains room for further improvement in this field of research.

SUMMARY

A deep semantic structured module (DSSM) is described herein for projecting an input item to an output item in a semantic space. For example, the input item may correspond to an input vector that represents one or more words, while the output item may correspond to a concept vector that expresses semantic information regarding the word(s). A training system produces the model using click-through data. More specifically, in one implementation, the training system discriminatively trains the model using the click-through data such that a conditional likelihood of clicked documents, given respective queries, is maximized, and the conditional likelihood of non-clicked documents, given the respective queries, is reduced.

In one application, a search engine may use the DSSM to map a query into a semantic space. The search engine may then compute the respective similarities between the query and a plurality of documents, within the same semantic space. Based on those similarity measures (along with other optional ranking factors), the search engine can identify a subset of documents which are most relevant to the query, if any. The search engine may offer satisfactory performance in view of the fact that its runtime objective (of discriminating relevant documents from irrelevant documents) is aligned with the objective function that was used to train the DSSM's model.

According to one illustrative feature, the DSSM may be implemented as a deep neural network (DNN) having plural hidden layers. The model corresponds to parameter values which define how information is propagated through the DNN.

According to another illustrative feature, a dimensionality-reduction module (DRM) may transform the input item into a lower-dimension item, and then submit the lower-dimension item to the DSSM. The lower-dimension item may be expressed in a space having a much smaller dimensionality compared to the space associated with the original input item. In one implementation, the DRM can perform the transforming operation by expressing the input item as a plurality of n-grams, and then mapping the identified n-grams into a lower-dimension vector within the dimension-transformed space. According to one benefit, the training system can perform its training operation in a more efficient manner by acting on lower-dimension items, as opposed to operating on the original untransformed input items (which may have very high dimensionality).

According to another illustrative aspect, the DRM can be also used as a standalone component, that is, without subsequently feeding the lower-dimension items to the DSSM.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for mapping input items (e.g., input vectors representing one or more words) into a semantic space, using a model that is discriminatively trained based on click-through data. Section B sets forth illustrative methods which explain the operation of the functionality of Section A. Section C describes illustrative computing functionality that can be used to implement any aspect of the features described in Sections A and B.

Figure 14:
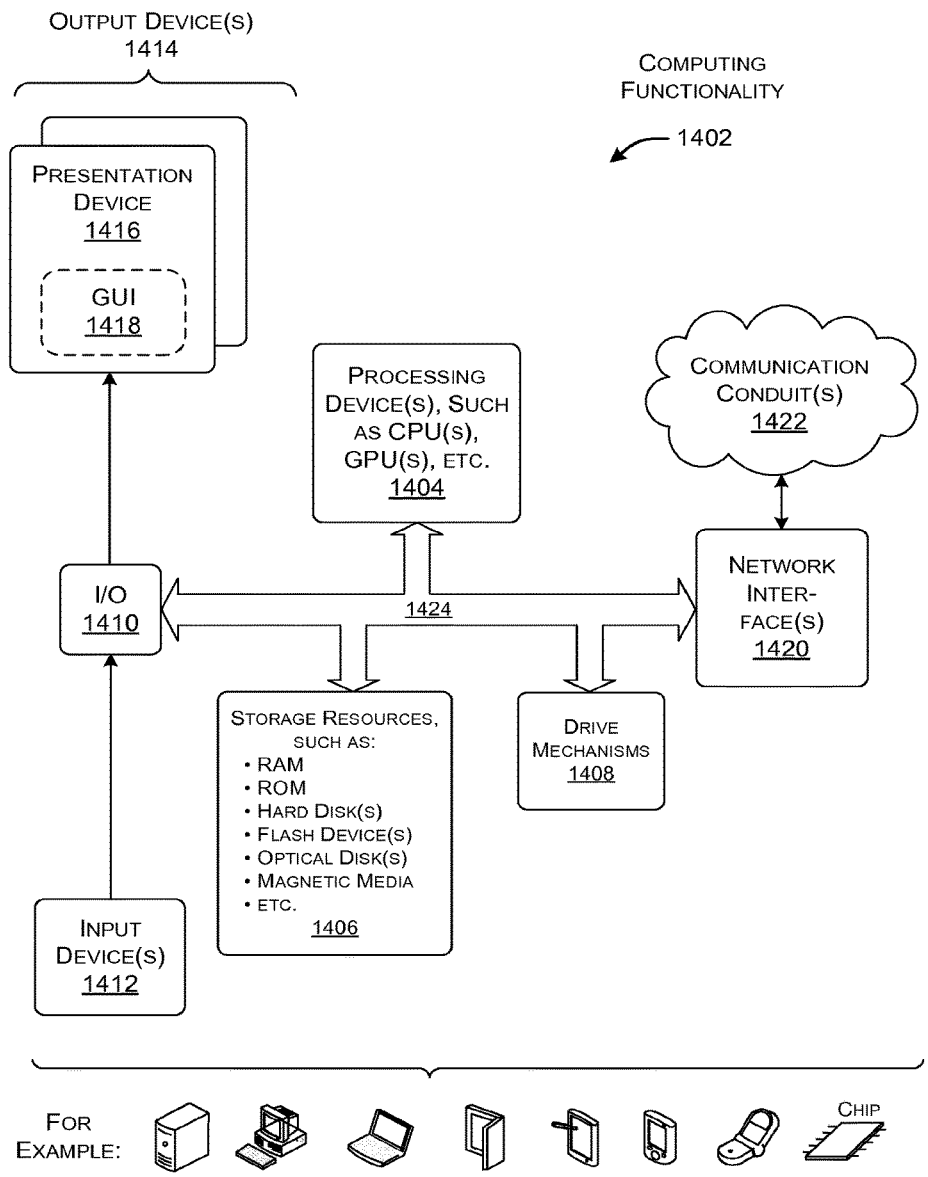
FIG. 14 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 14, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The phrase "means for" in the claims, if used, is intended to invoke the provisions of 35 U.S.C. § 112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Functionality

A.1. Overview

Figure 1:
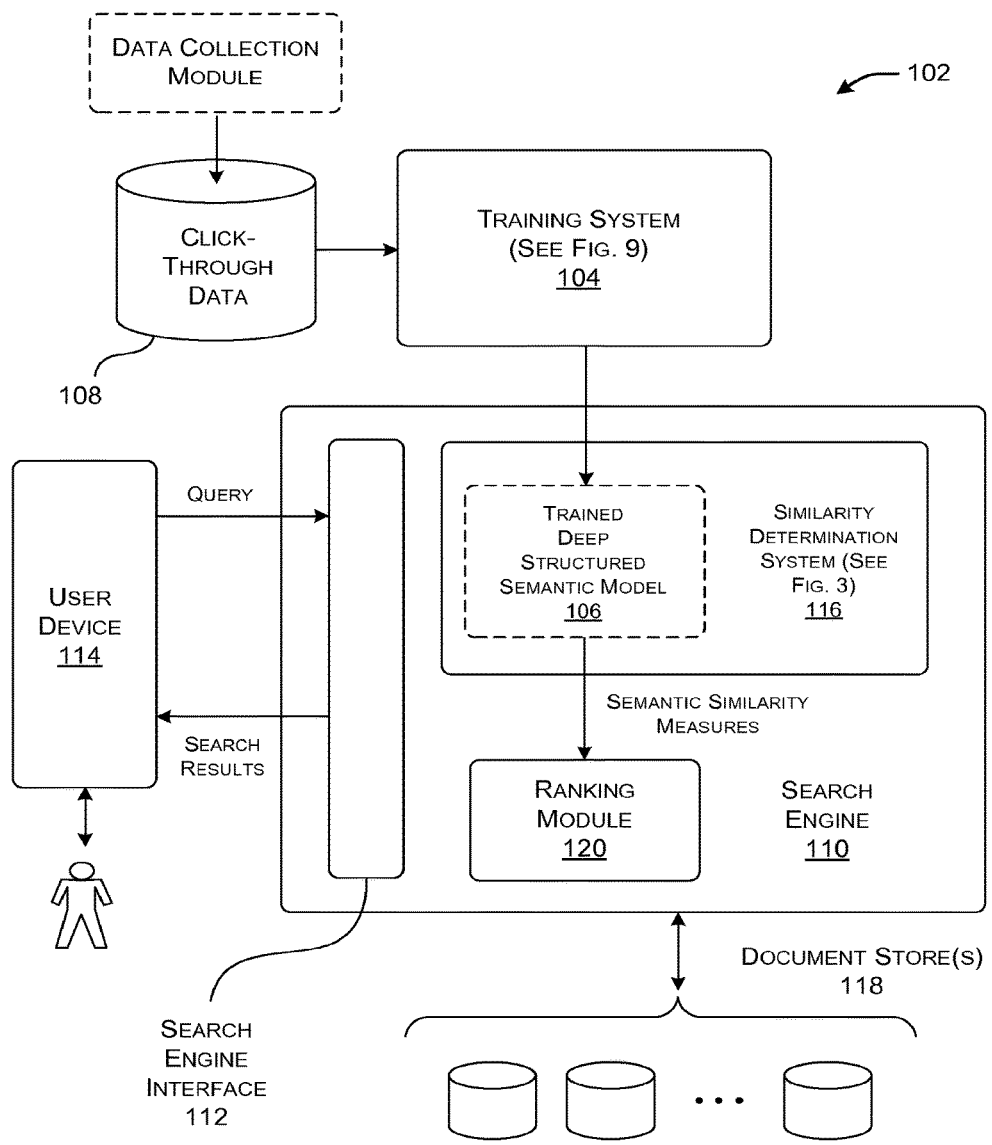
FIG. 1 shows an illustrative environment in which a search engine processes queries submitted by users. The search engine performs this task using a similarity determination system, which, in turn, uses a deep structured semantic model.

FIG. 1 shows an environment 102 that includes a training system 104 for producing a deep structured semantic model 106 (henceforth, simply "model" 106). The training system 104 produces the model based on click-through data maintained in a data store 108. More specifically, as will be explained in greater detail below, the training system 104 produces the model 106 such that a conditional likelihood of clicked documents, given respective queries, is maximized, and the conditional likelihood of non-clicked documents, for the respective queries, is reduced.

Different systems may make use of the model 106 that is produced by the training system 104. In the illustrative environment of FIG. 1, a search engine 110 provides a search engine interface 112 for receiving a query from a user, who inputs the query via a user device 114. A similarity determination system 116 then uses the model 106 to project the query into a semantic space. More formally stated, the similarity determination system 116 projects a query input item that represents the query (e.g., corresponding to an input vector) into a query output item in the semantic space. The query output item captures latent semantic content associated with the query, and may be expressed as a query concept vector.

The similarity determination system 116 can then match the query against each of a plurality of documents in the semantic space, to generate a plurality of similarity measures. More formally stated, the similarity determination system 116 determines the similarity, in the semantic space, between the query output item and each document output item. Each document output item, in turn, is produced by projecting a document (providing in a data store 118) into the semantic space, in the same manner that the query is projected into the semantic space. Each document output item may be expressed as a document concept vector.

A ranking module 120 may use the similarity measures, optionally along with any other features, to assign ranking scores to the documents, given the query. Each ranking score indicates the assessed relevance of a particular document to the submitted query. Based on the ranking scores, the ranking module 120 can then generate a list of documents that are deemed most relevant to the user's query. The list may identify zero, one or more documents. Finally, the search engine interface 112 can return the list of documents to the user device 114 for the user's inspection.

From a very high-level perspective, the model 106 is discriminatively trained using an objective function that aims to boost the relevance of clicked documents, and decrease the relevance of non-clicked documents, with respect to respective queries in the click-through data. This objective function aligns with the principal objective of the search engine 110 itself. For this reason, the search engine 110 may be able to leverage the model 106 to provide highly relevant search results to Users.

In the case of FIG. 1, the user may specify a query in manual form, e.g., by typing one or more query terms into an interface page provided by the search engine interface 112. The user may also receive search results in a conventional manner, e.g., by receiving a ranked list of hyperlinks and snippets associated with the identified documents. However, the search engine 110 can receive a search query in any manner, and provide its search results in any form. For example, in an alternative case, the user device 114 can form a query by recognizing keywords in a user's speech. In another alternative technique, some component of the environment 102 can automatically formulate a query that expresses features associated with a triggering circumstance. For instance, the user device 114 can formulate a query in an automatic manner based the current location of the user.

Further, in the case of FIG. 1, the similarity determination system 116 uses the model 106 to compare a query with at least one document, within a semantic space. But more generally, the similarity determination system 116 can use the model 106 to determine the similarity between any two instances linguistic information, in any application context. For example, in another case, the similarity determination system 116 can use the model 106 to compare two documents within the semantic space, or to compare two phrases within the semantic space, etc. For instance, a user may identify a first document in a corpus as a query document, and then ask the similarity determination system 116 to identify one or more other documents that are semantically similar to the query document, if any.

Nevertheless, to simplify the explanation, the scenario most frequently evoked herein corresponds to the above-described case in which an end user uses his or her user device 114 to submit a query to the search engine 110. Further, to simplify the explanation, the similarity determination system 116 will henceforth be explained for the specific case in which each input item constitutes an input vector and each output item constitutes a concept vector. A vector, as that term is used herein, broadly corresponds to any information having two or more components, e.g., a component for each element in a given vocabulary or set.

Figure 2:
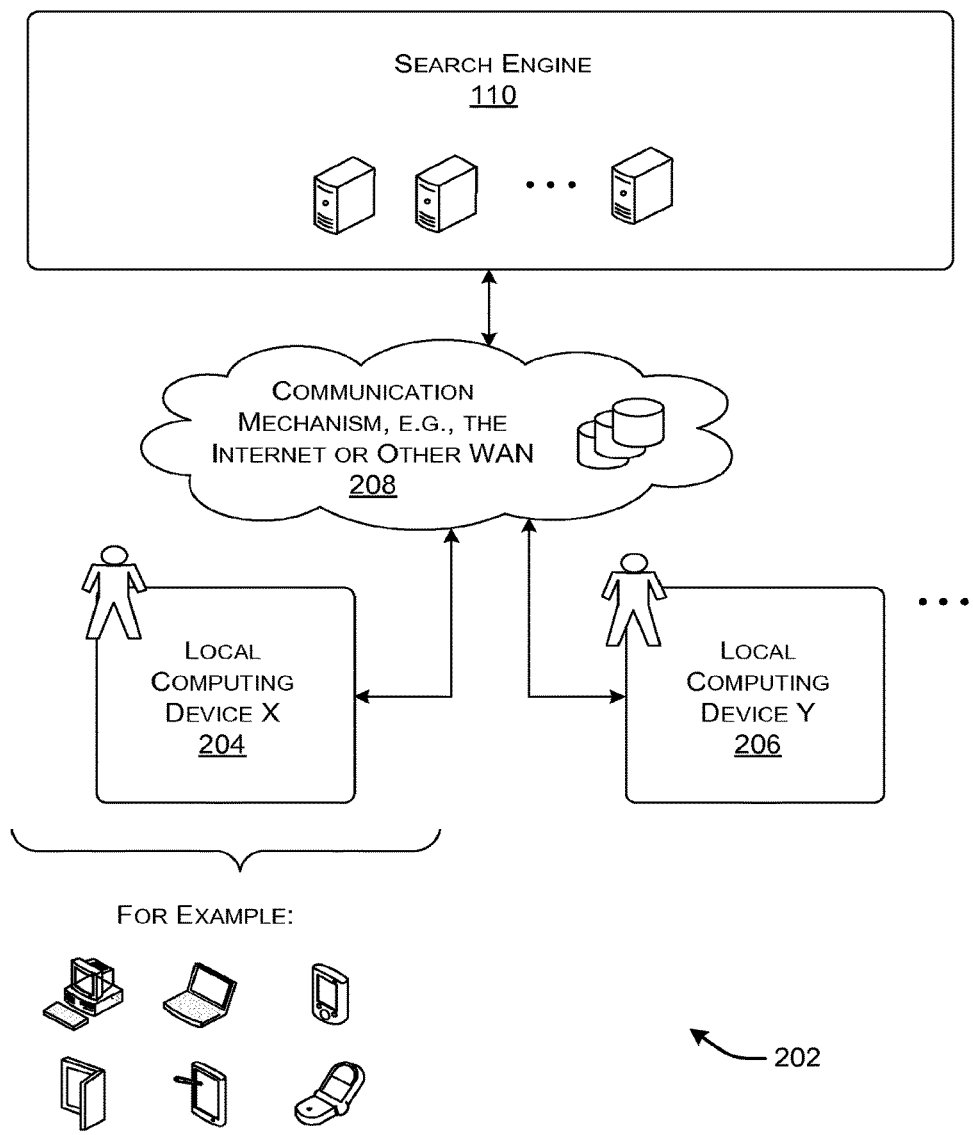
FIG. 2 shows one implementation of the environment of FIG. 1.

FIG. 2 shows a system 202 which represents one implementation of the environment 102 shown in FIG. 1. Here, the search engine 110 is implemented by one or more servers, optionally together with other computing equipment (e.g., data stores, routers, load balancers, etc.). The search engine 110 may be provided at one physical site or distributed over plural physical sites.

Users operate respective user devices (e.g., user device 204 and user device 206) to interact with the search engine 110. Each user device may represent any computing equipment, such as a personal computer, a laptop computer, a computer work station, a smartphone or other type of cellular phone, a media consumption device, a tablet-type computing device, a wearable computing device, a set-top box, a game-playing console, and so on.

Each user device may interact with the search engine 110 via any communication mechanism 208, such as a wide area network (e.g., the Internet), a local area network, a point-to-point connection, and so on, or any combination thereof.

In an alternative implementation, one or more aspects of the search engine 110 can be implemented by each user device. For example, a user can interact with a local computing device to search a local database. In that context, the local computing device can implement all aspects of the search engine 110.

Figure 3:
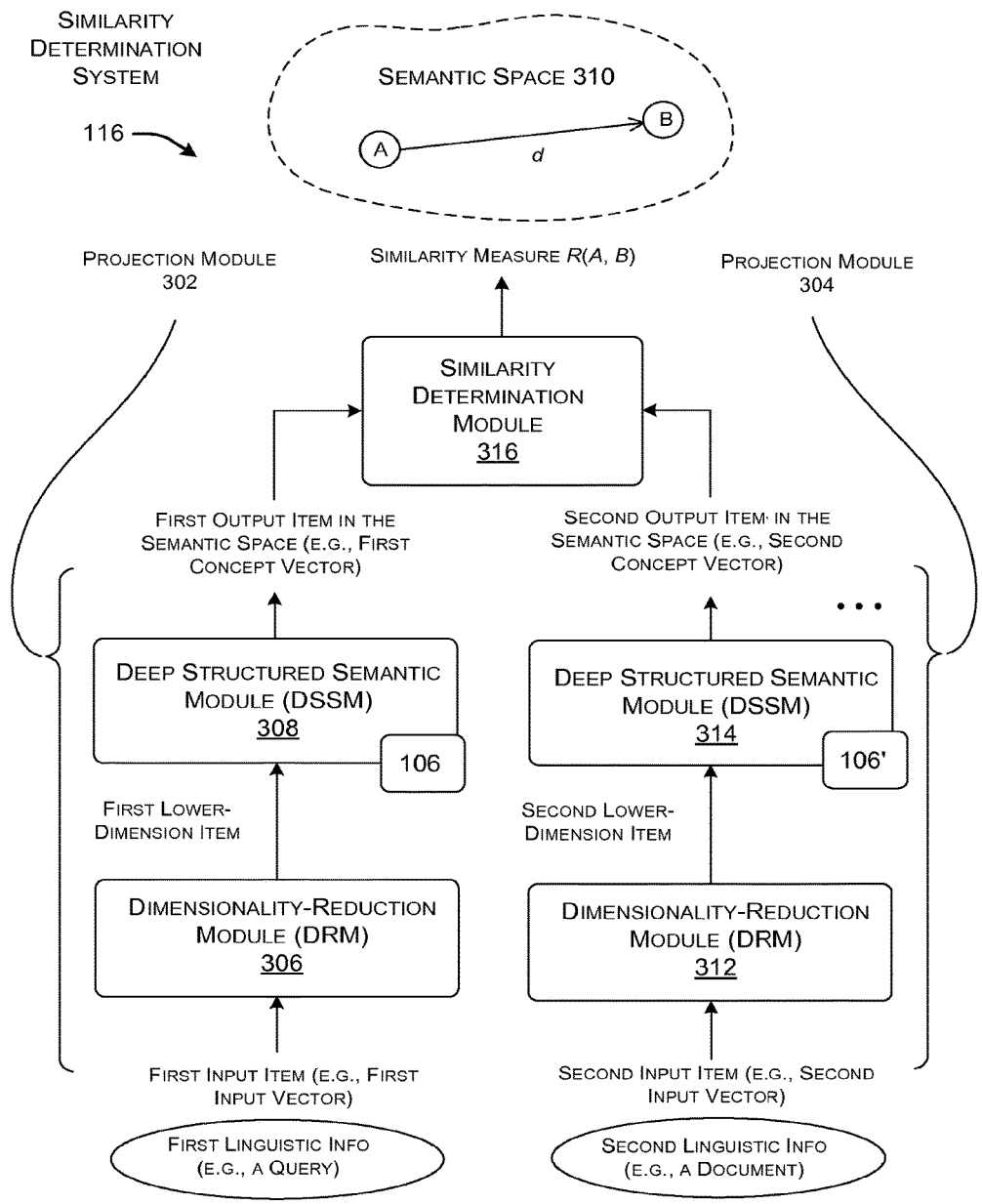
FIG. 3 shows one implementation of the similarity determination system of FIG. 1. The similarity determination system may employ one or more instances of a projection module.

FIG. 3 shows one implementation of the similarity determination system 116 of FIG. 1. The similarity determination system 116 is depicted as including two or more instances of a projection module, e.g., a first projection module 302 and a second projection module 304, etc. Each instance of this projection functionality maps an input vector, which represents linguistic information, into an output concept vector. The concept vector is expressed in a semantic space and reveals semantic information regarding the linguistic information.

More specifically, in one case, the similarity determination system 116 can actually provide two or more separate instances of projection functionality, to implement the plural projection modules (302, 304) shown in FIG. 3. For example, the similarity determination system 116 can provide two or more physical processing components associated with different instances of projection functionality. Alternatively, or in addition, the similarity determination system 116 can provide separate software-implemented instances of projection functionality, such as separate threads, objects, etc. Alternatively, or in addition, the similarity determination system 116 can use a single instance of the projection functionality to process separate instances of input items in series, for example, by projecting a set of documents to the semantic domain, one after the other.

Consider the first projection module 302. That functionality includes a dimensionality-reduction module (DRM) 306 and a deep structured semantic module (DSSM) 308. The DRM 306 accepts an input vector which represents linguistic information. For example, assume that the linguistic information corresponds to a query that includes one or more strings (e.g., words). The original input vector can represent the linguistic information in any manner, such as a bag-of-words representation. More specifically, in that formulation, the input vector includes an entry for each possible word in a vocabulary. Each entry has a value that identifies the number of times that the corresponding word appears in the linguistic information. For example, for a query "choosing a dog at the dog shelter," the entry in the input vector for "dog" will be assigned a value of 2.

As set forth in Subsection A.3, the DRM 306 can apply any strategy to transform the input vector into a lower-dimension item. The lower-dimension item may be expressed as a vector, and is henceforth referred to as a lower-dimension vector. As the name suggests, the lower-dimension vector has fewer dimensions compared to the original input vector. In other words, the space associated with the lower-dimension vector is smaller than the space associated with the original input vector.

The projection module 302 reduces the dimensionality of each input vector for the principal purpose of expediting the processing performed by the training system 104; otherwise, the training may become practically intractable in some cases. The use of the DRM 306 also expedites the runtime processing of input vectors, e.g., corresponding to queries submitted by users, once the model has been generated in the training phase. In other cases, the training system 104 may perform training on the "raw" input vectors, without reduction in the dimension of the input vectors. For those cases, the projection module 302 can omit the DRM 306, in which case the DSSM 308 operates directly on the input vectors in both the training phrase and the runtime application phase.

The DSSM 308 projects each lower-dimension vector (or the original input vector) into a concept vector in a semantic space 310. The DSSM 308 uses the model 106 to perform this task.

The second transformation module 304 performs the same operations described above on a second linguistic item. For example, assume that the second linguistic item corresponds to a document, or a portion of the document. A DRM 312 then transforms an input vector, which represents the document, into a lower-dimension vector. The DSSM 314 then projects the lower-dimension vector into a concept vector in the semantic space 310. The DSSM 316 uses a model 106' to perform this task.

In one case, the model 106 (used by the DSSM 308) is the same as the model 106' (used by the DSSM 314). The training system 104 may produce that single model in a single training process based on a single corpus of click-through data. In another case, the training system 104 produces the model 106 in a first training process, and produces the model 106' in a second training process. Each training process can potentially operate on a different corpus of click-through data. But in the following explanation it will henceforth be assumed that a single model 106 is used in all instantiations of the DSSM.

For simplicity, assume that symbol A represents a first concept vector generated by the first projection module 302. The symbol B represents a second concept vector generated by the second projection module 304. A similarity R(A, B) between A and B in the semantic space 310 represents the extent to which the first linguistic information (e.g., the query) expresses similar concepts to the second linguistic information (e.g., the document). The similarity between two concept vectors is inversely proportional to the distance (d) between them in the semantic space 310, such that two concept vectors that are "close" together will have a relatively high similarity measure.

A similarity determination module 316 determines the above-described similarity measure R(A, B). The similarity determination module 316 can use any technique to make this computation, such as by forming a cosine similarity measure, as described in greater detail below.

A.2. The Deep Structured Semantic Module (DSSM)

Figure 4:
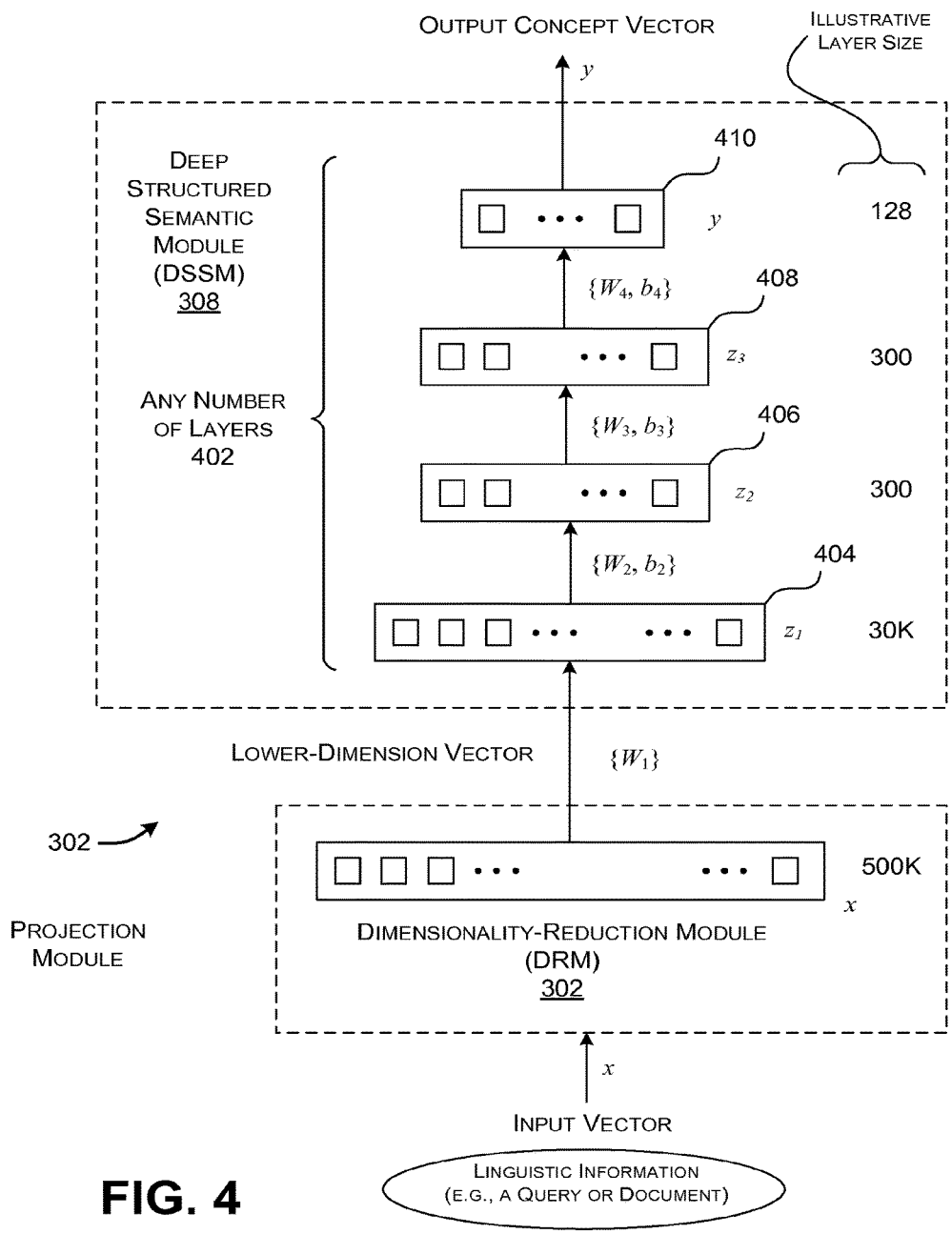
FIG. 4 shows one implementation of a projection module, for use in the similarity determination system of FIG. 3.

FIG. 4 shows one implementation of the projection module 302 introduced with respect to FIG. 3. To summarize, the projection module 302 includes a dimensionality-reduction module (DRM) 306 for mapping an input vector, here represented by x, into a lower-dimension vector. The input vector represents linguistic information (such as a query or a document) as a bag of words, or in some other manner of expression. A deep structured semantic module (DSSM) 308 projects the lower-dimension vector into an output concept vector within a semantic space. This subsection provides additional details regarding the DSSM 308. The next subsection provides additional details regarding the DRM 306.

The DSSM 308 may be implemented as a deep neural network (DNN), composed of a plurality of layers 402. FIG. 4 specifically shows that the DSSM 308 includes four layers, but, more generally, the DSSM 308 can include any number of layers. Each layer, in turn, includes a plural of elements, referred to as neurons. Each neuron stores a value. Each neuron, in a given layer, is furthermore connected to zero, one or more neurons in an immediately anterior layer (if any), and zero, one or more neurons in an immediately posterior layer (if any). Here, "anterior" and "posterior" refer to adjacent layers in relation to a direction of information flow through the DNN, which is from bottom to top in FIG. 4. That is, with respect to a given layer, anterior layers represent lower layers, while posterior layers represent higher layers.

The layers 402 include a bottommost layer 404 for storing values, collectively denoted by $z_1$. More specifically, the layer 404 represents the input to the DSSM 308, and therefore stores the values associated with the lower-dimension vector provided by the DRM 306. A next layer 406 stores a collection of values $z_2$ that are derived from the values $z_1$ in the first layer. A next layer 408 stores a collection of values $z_3$ that are derived from the values $z_2$ in the layer 406. A final output layer 410 stores a collection of values y that are derived from the values $z_3$ in the layer 408.

FIG. 4 also represents the various layers (404, 406, 408, 410) as boxes having different respective lengths to indicate that the different layers have different respective dimensionalities. Without limitation, in one implementation, the input vector x fed to the DRM 306 has a dimensionality of 500K, indicating that there are 500K possible words in an identified vocabulary. The layer 404 has a dimensionality of 30K. For instance, if an n-gram hashing technique is used to produce the lower-dimension vector, then the dimensionality of layer 404 means that there are 30K accepted n-grams (e.g., tri-grams) within the original corpus of 500K words. The layer 406 and the layer 408 each have a dimensionality of 300 elements. And the layer 410 has a dimensionality of 128 elements. Overall, the projection module maps the input vector (x), having a dimensionality of 500K, to the output concept vector (y) in the semantic space, having a dimensionality of 128 elements. To repeat, however, another implementation of the DSSM 308 can employ any number of layers, each of which can have any size.

More formally stated, in one implementation, the values $z_1$ in the layer 404 can be expressed as $z_1 = W_1 x$, where $W_1$ represents whatever transformation is used by the DRM 306 to produce the lower-dimension vector. The values $z_i$ in layers 406 and 408 may be expressed as $z_i = f(W_i z_{i-1} + b_i)$, for i=2, ... N−1. And the values y in the layer 410 may be expressed as $y = f(W_N z_{N-1} + b_N)$, where, in the specific example of FIG. 4, N=4. The symbol $W_i$ denotes the i-th weighting matrix produced by the training system 104 (of FIG. 1), and the symbol $b_i$ refers to an optional i-th bias term, also produced by the training system 104. The function $f(x)$, referred to as the activation function, can be formulated in different ways, such as the following tan h function:

$$f(x) = \frac{1 - e^{-2x}}{1 + e^{-2x}}. \tag{1}$$

Figure 5:
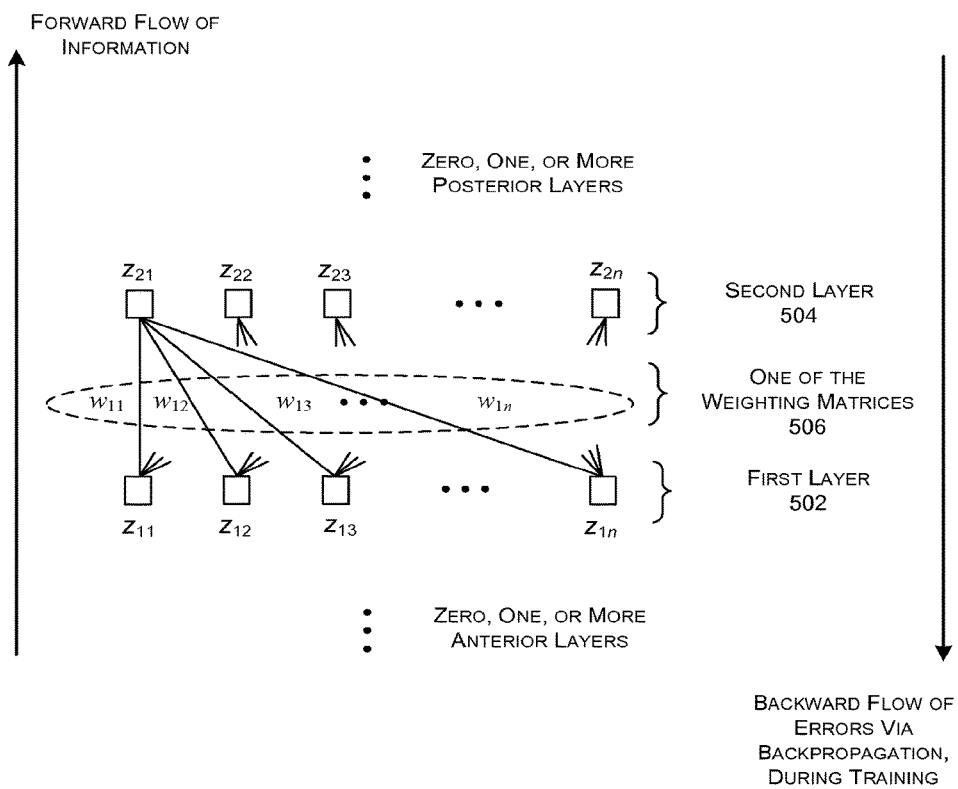
FIG. 5 shows a portion of a deep neural network provided by the projection module of FIG. 4, e.g., showing the manner in which values associated with a first layer contribute to values associated with a second layer.

FIG. 5 clarifies the use the above equations with respect to small portion of two layers, namely, a first layer 502 and a second layer 504. The individual elements in each layer correspond to neurons which store values. The value $z_{21}$ of the first neuron in the second layer 504 can be computed by first forming a weighted linear combination of the values in the first input layer 502 that may contribute to this value, as in $\gamma = z_{11} * w_{11} + z_{12} * w_{12} + \ldots z_{1n} * w_{1n}$. The weighted sum $\gamma$ can then be plugged into the above-stated tan h function (in place of x) to derive the value for $z_{21}$. That is, $z_{21} = f(\gamma)$. The individual weighting values used in forming the weighted sum γ collectively form one of the weighting matrices $W_i$ generated by the training system 104, e.g., weighting matrix 506. For simplicity, the contribution of the bias factors in forming the weighted sum has been omitted in the above explanation.

Figure 6:
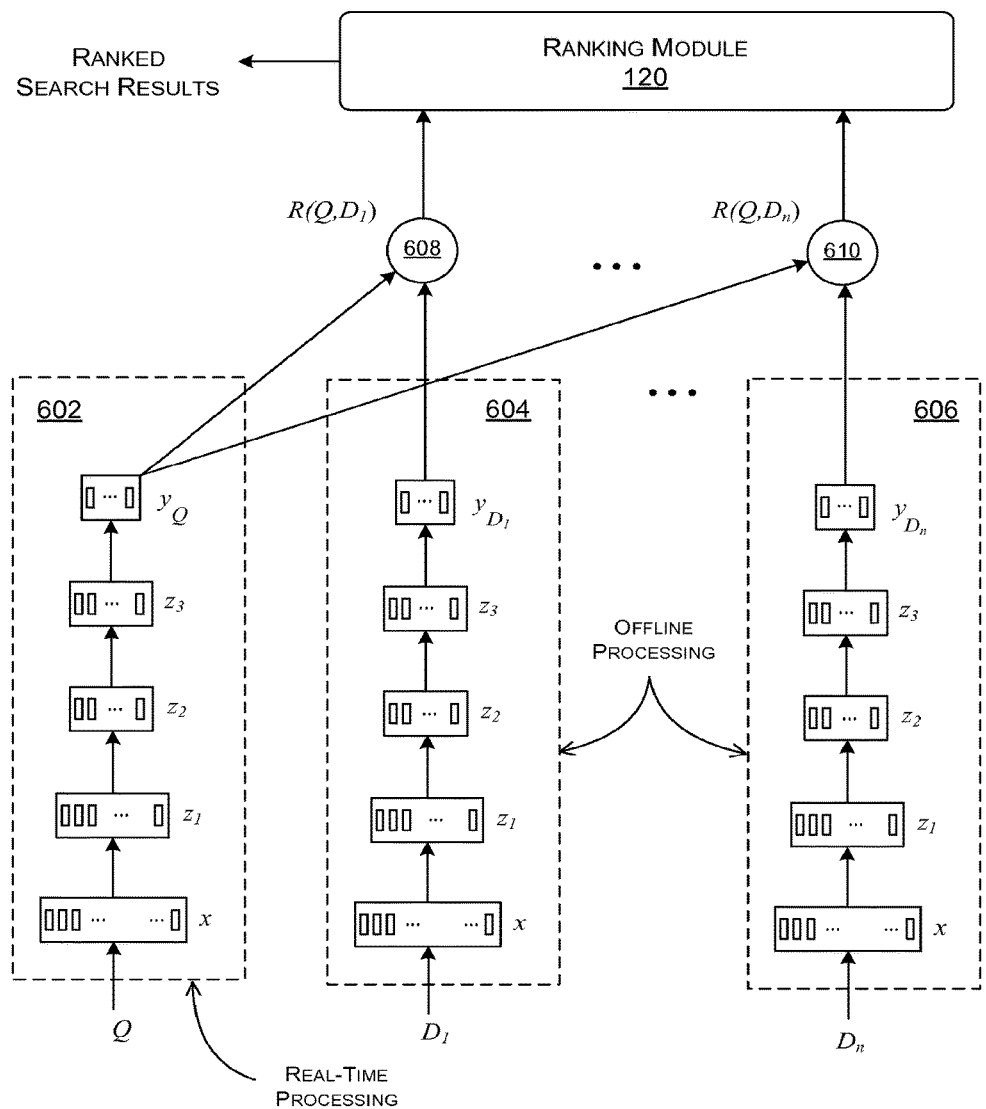
FIG. 6 shows one application of the similarity determination system of FIG. 3.

FIG. 6 shows an application of the similarity determination system 116, and which also serves to summarize the components set forth with respect to FIGS. 3 and 4. In FIG. 6, a first projection module 602 produces a concept vector which expresses a query (Q) in a semantic space. A second projection module 604 produces a concept vector which expresses a document ($D_1$) in the same semantic space. A third projection module 606 produces a concept vector which expresses a document ($D_n$) in the same semantic space, and so on.

More specifically, the three (or more) instances of the projection module can be implemented by separate physical components or software instances. Or the three (or more) instances of the projection module can be implemented by a single physical component or software instance, which processes linguistic items in series, one after the other. Further, the projection module 604 and the projection module 606, etc. can optionally perform their processing operations on the documents ($D_1, \ldots, D_n$) as an offline process, that is, in advance of the user submitting the query Q.

A first similarity determination module 608 determines the similarity between the query Q and the document $D_1$ in the semantic space, while a second similarity determination module 610 determines the similarity between the query Q and the document $D_n$ in the semantic space. As noted above, each similarity determination module can compute the similarity between the query Q and a document D as a cosine similarity measure, as follows:

$$R(Q, D) = \operatorname{cosine}(y_Q, y_D) = \frac{y_Q^T y_D}{\|y_Q\|\|y_D\|}. \quad (2)$$

The similarity measures, provided by the similarity determination modules (608, 610) constitute input features provided to the ranking module 120. The ranking module can rank the relevance of the documents based on the similarity measures alone, e.g., by identifying the document with the highest similarity measure as the most relevant document, and the document with the lowest similarity measure as the least relevant document. Alternatively, the ranking module 120 can rank the documents based on the similarity measures in combination with other features that have a bearing on the relevance of the documents. For example, the ranking module 120 may employ a ranking function that is trained by a machine learning technique based on any combination of descriptive features associated with the queries and documents.

A.3. The Dimensionality-Reduction Module (DRM)

Figure 7:
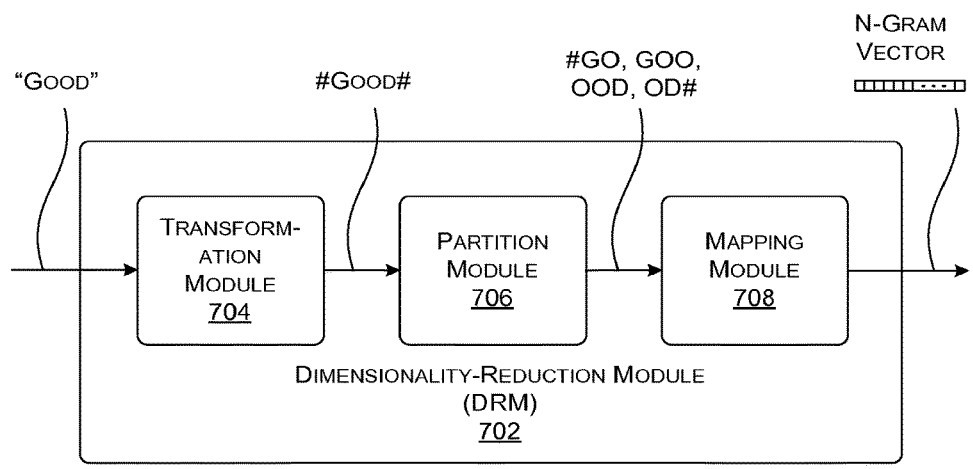
FIG. 7 shows one implementation of a dimensionality-reduction module, which is a component of the similarity determination system of FIG. 3.

FIG. 7 shows a dimensionality-reduction module (DRM) 702, which represents one implementation of the dimensionality-reduction modules (306, 312) of FIG. 4. Recall that one purpose of the DRM 702 is to reduce the dimensionality of each input vector, so as to render training performed by the training system 104 more efficient, and thus more commercially feasible, and to expedite runtime processing of input vectors in the application phase, e.g., in executing searches. Further, as will be described below, the DRM 702 can produce results that are useful in other applications, that is, other than the scenario in which DRM 702 serves as an input stage to a deep structured semantic module (DSSM).

To begin with, a transformation module 704 accepts an input vector and performs one or more optional preliminary transformations on the input vector. For example, assume that the linguistic information in question is a query having the sole keyword "good." The transformation module 704 can modify the information associated with the input vector by adding a beginning token to the start of the word, and adding an ending token to the end of the word, e.g., to produce "#good#". This result is generally referred to as a converted item.

A partition module 706 breaks the converted item into a plurality of n-grams. Each n-gram contains a sequence of n consecutive letters in the input word. For example, in the case of FIG. 7, the partition module 706 breaks the converted item "#good#" into the four tri-grams "#go," "goo," "ood," and "od#". A mapping module 708 then maps the identified n-grams to entries in the lower-dimension vector. For example, the mapping module 708 can produce a lower-dimension vector having 30K entries, corresponding to all the possible permutations of three-letter sequences that may be used in the 500K vocabulary associated with the input space. All entries in the 30K-element vector will have a count of zero, except the entries for "#go," "goo," "ood," and "od#", which will each have a count of 1.

There are relatively rare cases in which two different words may map to the same n-gram vector. However, as these cases are very rare, the DRM 702 can effectively ignore them without having a noticeable effect on the performance of the DRM 702. Or the DRM 702 can provide special processing to addresses these rare cases, e.g., by artificially inducing distinguishing vectors for words which collide in the dimension-reduced space.

Figure 8:
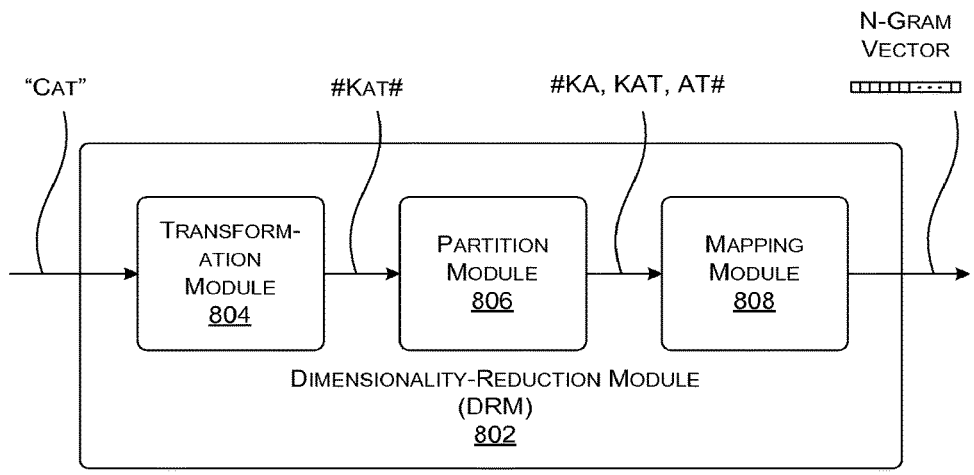
FIG. 8 shows another implementation of a dimensionality-reduction module.

FIG. 8 shows a dimensionality-reduction module (DRM) 802 having the same components described above, that is, a transformation module 804, a partition module 806, and a mapping module 808. These modules perform the same functions that were described above with reference to FIG. 7. In the case of FIG. 8, however, the transformation module 804 performs any type of additional transformation on the input vector. For example, the transformation module 804 can first convert the input word "cat" to its phonetic representation, e.g., "kat". The transformation module 803 may then add beginning and ending tokens to the phonetic representation in the manner stated above, to produce "#kat#".

As a point of clarification, FIGS. 7 and 8 represent cases in which each input vectors represent a single string. But an input vector may include two or more strings. In that case, the mapping modules (708, 808) can produce counts that represent the total number of n-grams of particular kinds that appear within the two or more strings. For example, the phrase "good God" would include a count of 2 for the tri-grams "#go" and "od#" after ignoring the case. The transformation modules (704, 804) can optionally join the two or more strings together before sending them to the partition modules (706, 806), e.g., to create the single string "goodGod".

Returning briefly to FIG. 3, the DRMs (306, 312) serve as input stages to the DSSMs (308, 314). In an alternative case, the DRMs (306, 312) can feed their lower-dimension vectors directly into the similarity determination module 316, without the use of the DSSMs (308, 314). For example, the first DRM 306 can form a dimension-transformed representation of a query, while the second DRM 312 can form a dimension-transformed representation of a word or phrase in a document. The similarity determination module 316 can then compare these two lower-dimension vectors to determine the similarity between them. This mode of operation is potentially useful to help generalize the representations of instances of linguistic information, making them more likely to agree despite the presence of small differences between the surface representations of the linguistic items.

Finally, note that the DRMs (306, 312) in FIG. 3 can use any technique to reduce the dimensionality input vectors that are fed to them, rather than, or in addition to, the n-gram hashing technique described above. For example, in another case, the training system 104 can produce a reduced-dimension matrix R having a prescribed distribution of values (but note that such training is outside the context of the training of the model 106). In one merely representative case, the matrix R can have entries having values of 1 and −1 with equal probabilities, and values of 0 with a probability of $1-1/\sqrt{d}$, where d refers to the dimensionality of the space in which input information is expressed. A DRM can then multiply the input vector x with the matrix R, as in $z_1 = Rx$, to produce a lower-dimension vector. One drawback of this technique is that it does not, without modification, allow for the processing of newly-encountered words that are unaccounted for in the original vocabulary. The n-gram hashing technique, on the other hand, can successfully address this situation because it can successfully interpret the n-grams in the new word.

The weighting matrix $W_1$ shown in FIG. 3 generically represents whatever information is used to by the DRMs (306, 312) to perform their transformation tasks.

A.4. The Training System

Figure 9:
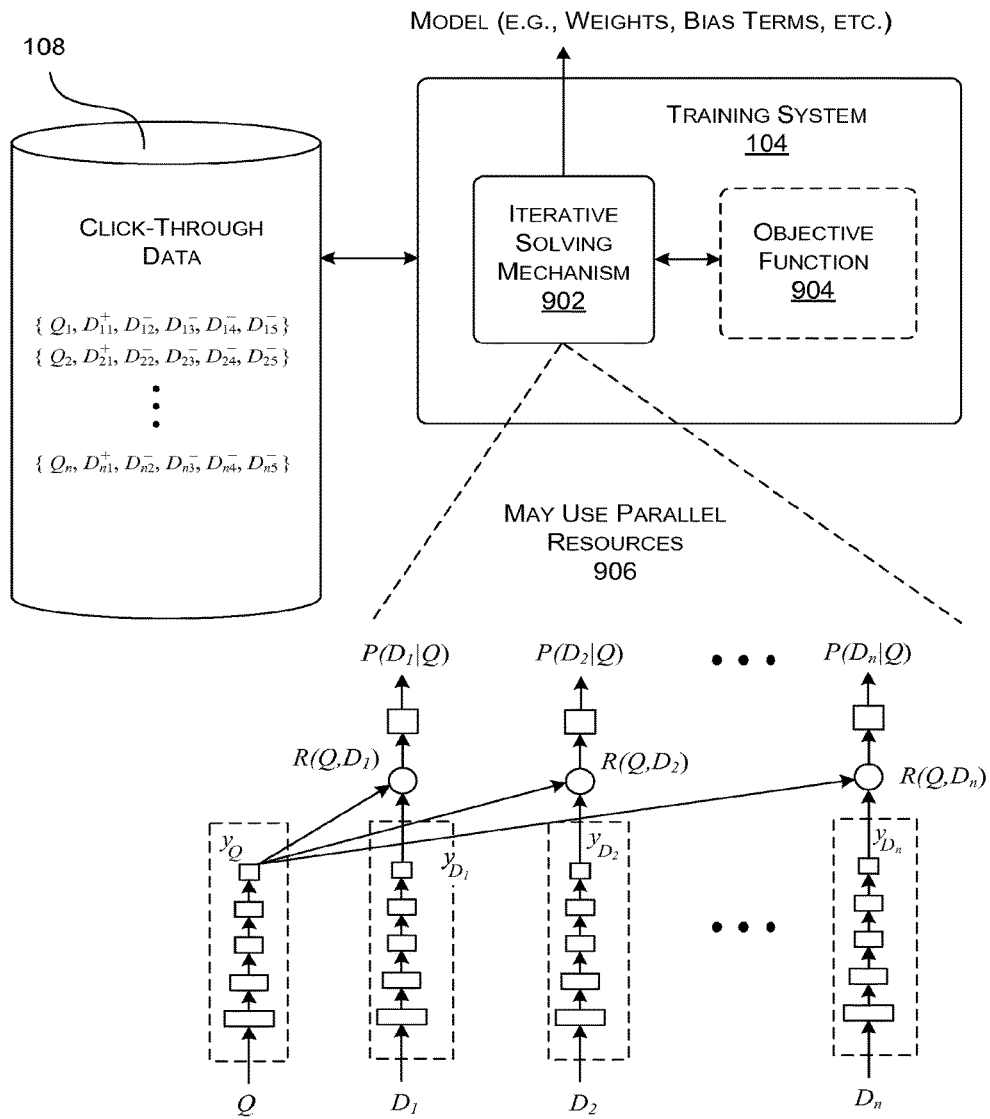
FIG. 9 shows one implementation of a training system, also shown in FIG. 1. The training system produces a model for use by the similarity determination system.

FIG. 9 shows one implementation of the training system 104 of FIG. 1. The training system 104 processes a corpus of click-through data (provided in a data store 108), to generate the model 106. The model 106 represents the collection of weighting matrixes ($W_i$) and bias factors ($b_i$) shown in FIG. 3. Collectively, the parameter values associated with the model 106 are referred to using the symbol Λ.

The click-through data generally describes queries submitted by actual users over some span of time, together with an indication of documents that the users clicked on and the documents that the users failed to click on after submitting those queries. Here, the term "click" is intended to have broad connotation. It may describe the case in which a user literally clicks on an entry within search results, or some other presentation of options, using a mouse device. But the term click also encompasses the cases in which a user selects a document in any other manner, such as by using a gesture on a touchscreen, a free-space gesture that is detected using a video camera, a keyboard action, etc. In other cases, the term click describes the case in which a user exhibits interest in a document, without expressly selecting the document, such as by hovering over an entry associated with the document, or gazing at the document (which can be detected by eye gaze recognition technology), and so on. In other cases, some other entity, other than a single user, is the agent which performs the selecting, such as a crowd of users, an automated software agent (e.g., a BOT), etc. Likewise, the terms "query" and "document" have broad meaning, each encompassing any linguistic information that includes one or more strings.

However formed, the click-through data encompasses a plurality of instances of training data, each constituting a training example. Each example includes a query (Q), a document ($D^+$) that the user selected in response to the query, and at least one document ($D^-$) that the user did not select in response to the query. In one case, a data collection module can mine this information from archives of a search engine. In that situation, a non-clicked document ($D^-$) of a training instance may correspond to an actual document that was offered to a user in response to a query, but which the user declined to select. In other cases, the collection module can randomly select any document from a corpus of documents, so long as the user did not actually select that document in response to the query. But in this latter case, there is no requirement that this document $D^-$ was actually presented to the user. In any case, FIG. 9 shows that a training example includes four non-clicked documents $\{D_2^-, D_3^-, D_4^-, D_5^-\}$, but a training example can include any number of such documents.

The training system 104 operates by using an iterative solving mechanism 902 to iteratively achieve an objective defined an objective function 904, by iteratively changing the parameter values of the model Λ. When the iterative processing is finished, the final parameter values constitute the trained model Λ. The objective function 904, in turn, mathematically expresses an aim which the model Λ seeks to achieve, when fully trained. In the present case, the objective function stipulates that the conditional likelihood of the clicked documents, given respective queries, is to be maximized, and the conditional likelihood of non-clicked documents, given the queries, is to be reduced. In other words, the objective function attempts to make the assessed relevance of clicked documents as high as possible, while simultaneously attempting to make the assessed relevance of non-clicked documents as low as possible.

To mathematically derive the objective function, first note that the probability P(D|Q) of a clicked document ($D^+$) in a training example, given a query Q, can first be expressed as a softmax function as follows:

$$P(D^+ | Q) = \frac{\exp(\psi R_\Lambda(Q, D^+))}{\sum_{D' \in D} \exp(\psi R_\Lambda(Q, D'))}. \quad (3)$$

The term $R_\Lambda(Q, D^+)$ represents the similarity between the query Q and the clicked document $D^+$ in the semantic space, for a given current selection of parameters associated with a model Λ. The term D represents the set of five documents in the training instance, including $D^+$ and the four non-clicked documents, although, as stated above, a training example can include any number of non-clicked documents. The term $R_\Lambda(Q, D')$ represents the similarity between the query Q and one of the documents (D') in the training example, in the semantic space. The symbol ψ represents an empirically-derived smoothing factor (e.g., which can be generated by analyzing a held-out dataset of training examples). For this individual training example, the objection function will express an attempt to make $R(Q, D^+)$ as high as possible, and each $R(Q, D^-)$ as low as possible, to overall make $P(D^+|Q)$ as high as possible, and each $P(D^-|Q)$ as low as possible.

Overall, when considering all of the training instances in the corpus of click-through data, the objective function involves attempting to maximize the conditional likelihood of the clicked documents given the corresponding queries, or equivalently, minimize the following loss equation:

$$L(\Lambda) = -\log \prod_{(Q, D^+)} P(D^+ | Q). \quad (4)$$

In other words, the objective is to derive a set of parameter values that minimizes the above equation, with respect to all of the examples in the empirical click-through data, or some subset thereof.

In one approach, the iterative solving mechanism 902 uses a gradient-based numerical optimization algorithm to solve the above problem, such as a gradient descent technique. The iterative solving mechanism 902, for instance, can apply the following update rule to perform the optimization:

$$\Lambda_t = \Lambda_{t-1} - \epsilon_t \frac{\partial L(\Lambda)}{\partial \Lambda}\bigg|_{\Lambda=\Lambda_{t-1}}. \tag{5}$$

Here, $\Lambda_t$ and $\Lambda_{t-1}$ are the models at the $t^{th}$ and $t-1^{th}$ iteration, respectively, and $\in_t$ is a learning rate parameter. From a high-level perspective, the iterative solving mechanism 902 makes a large change in the model $\Lambda$ whenever the model $\Lambda$ is changing by a relatively large amount from iteration to iteration, and makes a smaller change in the model $\Lambda$ whenever the model $\Lambda$ is changing by a slower amount.

More specifically, assume that there are M training examples in the click-through data. The $m^{th}$ training example is $(Q_m, D_m^+)$, corresponding to a particular pairing of a submitted query $(Q_m)$ and a document $(D_m^+)$ that has been clicked in response to that query. The loss function for that individual training instance is:

$$L_r(\Lambda) = -\log P(D_m^+|Q_m) \tag{6}.$$

The derivative of the loss function as a whole can therefore be expressed as:

$$\frac{\partial L(\Lambda)}{\partial \Lambda} = \sum_{m=1}^{M} \frac{\partial L_m(\Lambda)}{\partial \Lambda}. \tag{7}$$

The term $$\frac{\partial L_m(\Lambda)}{\partial \Lambda}$$

can be derived as follows. To simplify the notation, the subscript m will be omitted in the following. First, the loss function derived above can be expressed as follows:

$$L(\Lambda) = \log(1 + \Sigma_j \exp(-\psi \Delta_j)) \tag{8},$$

where $\Delta_j = R(Q,D^+) - R(Q, D_j^-)$. The gradient of the loss function with respect to the $N^{th}$ weight matrix $W_N$ is:

$$\frac{\partial L(\Lambda)}{\partial W_N} = \sum_j \alpha_j \frac{\partial \Delta_j}{\partial W_N}, \tag{9}$$

where:

$$\frac{\partial \Delta_j}{\partial W_N} = \frac{\partial R(Q, D^+)}{\partial W_N} - \frac{\partial R(Q, D_j^-)}{\partial W_N}, \tag{10}$$

and $$\alpha_j = \frac{-\psi \exp(-\psi \Delta_j)}{1 + \sum_{j'} \exp(-\psi \Delta_{j'})}. \tag{11}$$

Now, let $z_{i,Q}$ and $z_{i,D}$ refer to the activation in the hidden layer i for query Q and document D, respectively. And let $y_Q$ and $y_D$ refer to the output activation for the output layer 410 for query Q and document D, respectively. Further, to simplify the following notation, let a, b, and c correspond to $y_Q^T y_D$, $1/\|y_Q\|$, and $1/\|y_D\|$, respectively. Finally, assume that the activation function used by the model corresponds to the tan h function described above in Equation (1). With those definitions, each term in the right-hand side of Equation (10) can be calculated for the pair (Q, D) using the following formula:

$$\frac{\partial R(Q, D)}{\partial W_N} = \frac{\partial}{\partial W_N} \frac{y_Q^T y_D}{\|y_Q\|\|y_D\|} = \delta_{y_Q}^{(Q,D)} z_{N-1,Q}^T + \delta_{y_D}^{(Q,D)} z_{N-1,D}^T, \tag{12}$$

where:

$$\delta_{y_Q}^{(Q,D)} = (1-y_Q) \circ (1+y_Q) \circ (bcy_D - acb^3 y_Q) \tag{13}$$

and $$\delta_{y_D}^{(Q,D)} = (1-y_D) \circ (1+y_D) \circ (bcy_Q - abc^3 y_D) \tag{14}.$$

In the above equations, the operation $\circ$ is an element-wise multiplication (i.e., a Hadamard product).

The values $\{\delta\}$ for each successive hidden layer, moving down through the DNN in the direction of FIG. 3, can be computed through back projection as follows:

$$\delta_{i,Q}^{(Q,D)} = (1+z_{i,Q}) \circ (1-z_{i,Q}) \circ W_i^T \delta_{i+1,Q}^{(Q,D)} \tag{15}$$

and $$\delta_{i,D}^{(Q,D)} = (1+z_{i,D}) \circ (1-z_{i,D}) \circ W_i^T \delta_{i+1,D}^{(Q,D)} \tag{16}.$$

Correspondingly, the gradient of the loss function with respect to an intermediate weight matrix $W_i$, $i=2, \ldots, N-1$, can be computed as:

$$\frac{\partial L(\Lambda)}{\partial W_i} = \sum_j \alpha_j \frac{\partial \Delta_j}{\partial W_i}, \tag{17}$$

where $\frac{\partial \Delta_j}{\partial W_i}$ is equal to:

$$(\delta_{i,Q}^{(Q,D^+)} z_{i-1,Q^+}^T + \delta_{i,D^+}^{(Q,D^+)} z_{i-1,D^+}^T) - (\delta_{i,Q}^{(Q,D_j^-)} z_{i-1,Q^+}^T + \delta_{i,D_j^-}^{(Q,D_j^-)} z_{i-1,D_j^-}^T) \tag{18}$$

In a next "forward" phase of the training, the iterative solving mechanism 902 uses the thus-calculated weighting matrices to reprocess the various input vectors x, e.g., using the equations described in Subsection A.2. This operation updates the values associated with the neurons in the various layers 402 of the DNN. In a next "backward" phrase of the training, the iterative solving mechanism 902 then uses the above equations to re-compute the weighting matrices. The iterative solving mechanism 902 repeats the above-described training process until the DNN accurately models the behavior expressed in the click-through data, within a desired degree of tolerance. The bias factors $b_i$ can be derived using the same approach described above.

The training system 104 can perform the above-described processing using parallel processing resources 906. The parallel processing resources 906 can be implemented in any manner, e.g., using hardware units, software units, or a combination thereof. For example, the training system 104 can use an architecture similar to that shown in FIG. 3. Each separate processing unit, however implemented, can include a dimensionality-reduction module (DRM) for calculating a lower-dimension vector associated with a document D, a deep structured semantic module (DSSM) for generating an output concept vector $y_D$ in the semantic space, a similarity determination module for generating the similarity measure R(Q, D), and a softmax module for generating P(D|Q). Another processing unit can generate a representation $y_Q$ of the query Q in the semantic space.

B. Illustrative Processes

FIGS. 10-13 explain the various components of FIG. 1 in flowchart form. Since the principles underlying the operation of these components have already been described in Section A, certain operations will be addressed in summary fashion in this section.

Figure 10:
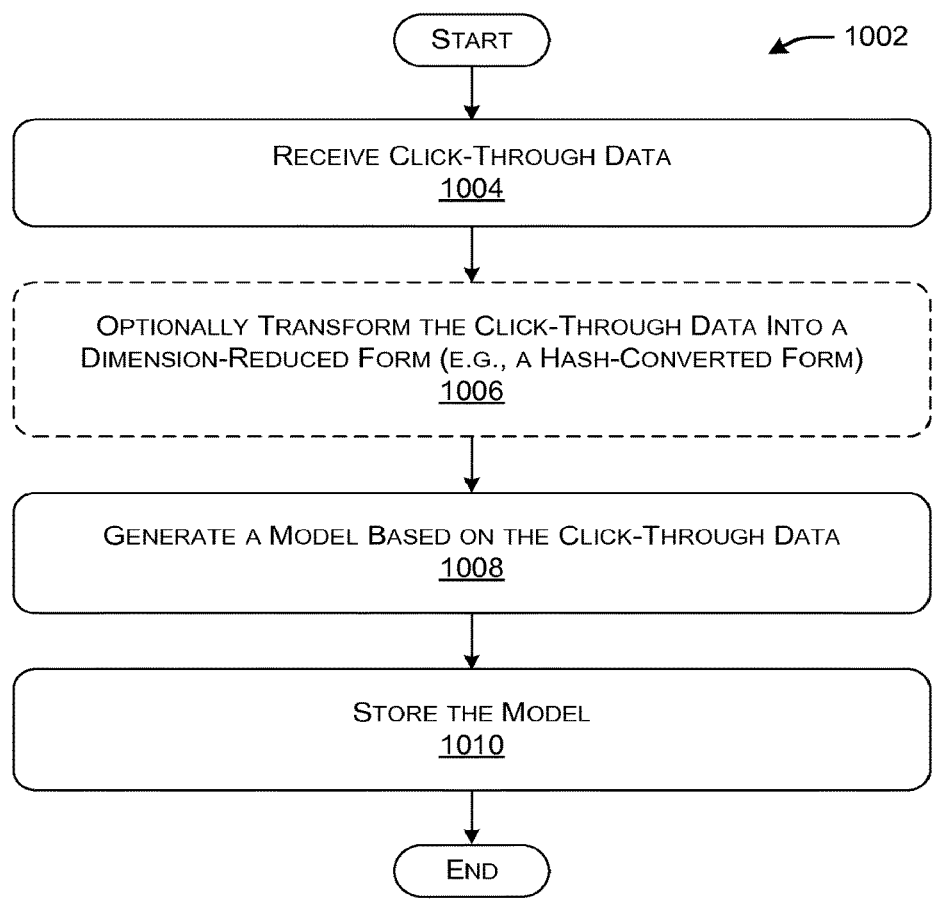
FIG. 10 is a flowchart that shows one illustrative manner of operation of the training system of FIG. 9.

Starting with FIG. 10, this figure shows a procedure 1002 by which the training system 104 produces the model 106. In block 1004, the training system 104 receives click-through data, e.g., from a search log archive provided by the search engine 110, or from some other source. In block 1006, the training system 104 optionally transforms queries and documents in the click-through data into a dimension-reduced form using one or more dimensionality-reduction modules (DRMs). This yields lower-dimension items. In block 1008, the training system 104 generates the model 106 using the lower-dimension items (or the original input items). In one approach, the training system 104 performs this training such that the conditional likelihood of clicked documents, given respective queries, is maximized, and the conditional likelihood of non-clicked documents, given the queries, is reduced. In block 1010, the training system 104 stores the model 106. For instance, block 1010 may constitute installing the model 106 in the search engine 110.

Figure 11:
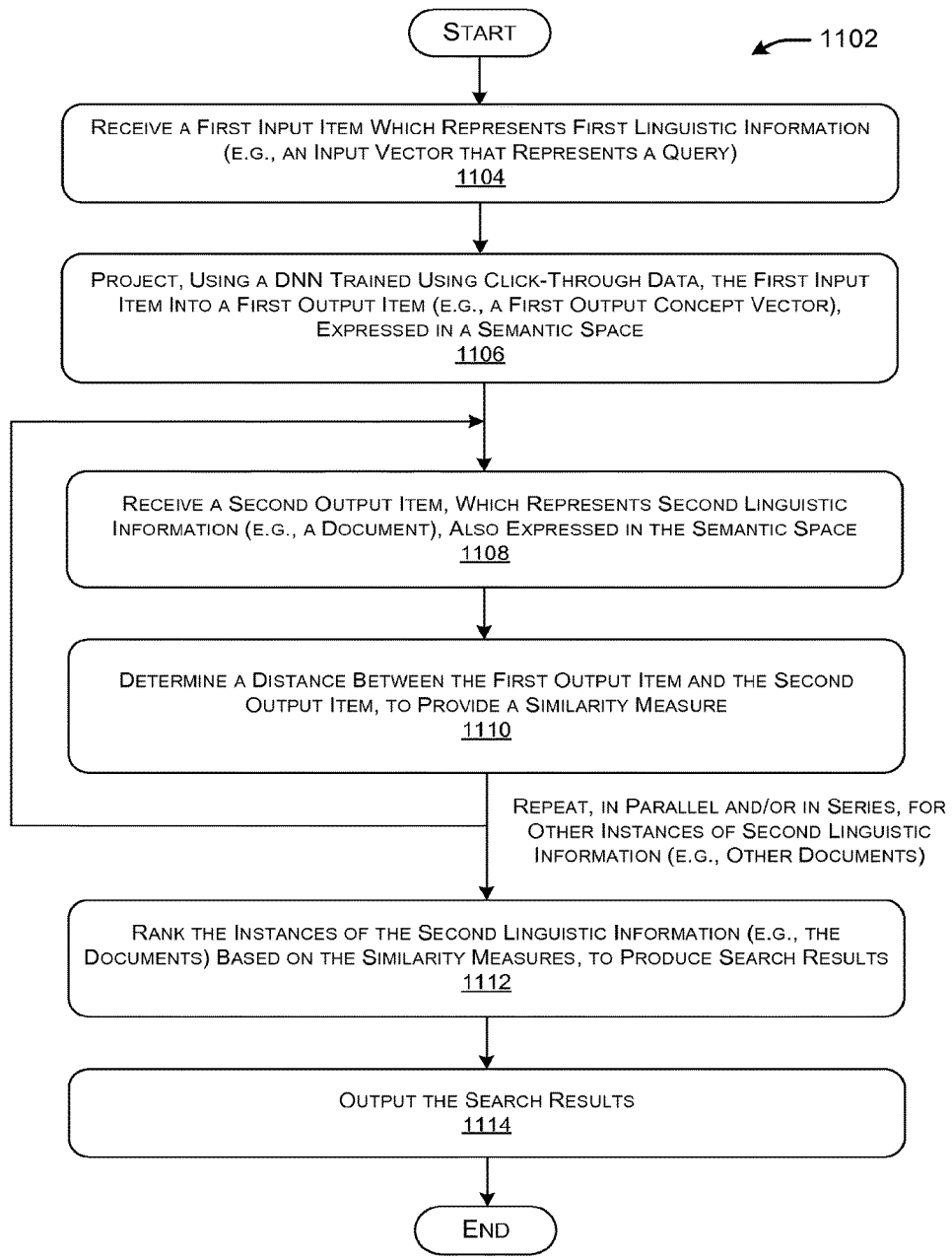
FIG. 11 is a flowchart that shows one illustrative manner of operation of the similarity determination system, which is a component that initially appears in FIG. 1.

FIG. 11 shows a procedure 1102 which describes the operation of the search engine 110 of FIG. 1. In block 1104, the similarity determination system 116 receives a first input item (e.g., a first input vector) which represents first linguistic information, e.g., a query. In block 1106, the similarity determination system 116 projects the first input item into a first output item (e.g., a first concept vector) expressed in a semantic space, using the model 106 trained as per the procedure of FIG. 10. In block 1108, the similarity determination system 116 receives a second output item (e.g., a second concept vector) that is also expressed in the semantic space. For instance, the similarity determination system 116 may have previously produced the second output item by projecting a second input item, representing a document, into the semantic space. In block 1110, the similarity determination system 116 determines a similarity measure which reflects a similarity between the first output item and the second output item, in the semantic space. The feedback loop indicates that the similarity determination system 116 can perform the above-described operation for one or more additional documents, to generate one or more additional similarity measures. More specifically, these per-document operations can be performed in series, as shown, or in parallel, or combination thereof. In block 1112, the ranking module 120 ranks the documents based on the similarity measures, to produce search results. In block 1114, the search engine 110 outputs search results that are provided in block 1112.

Figure 12:
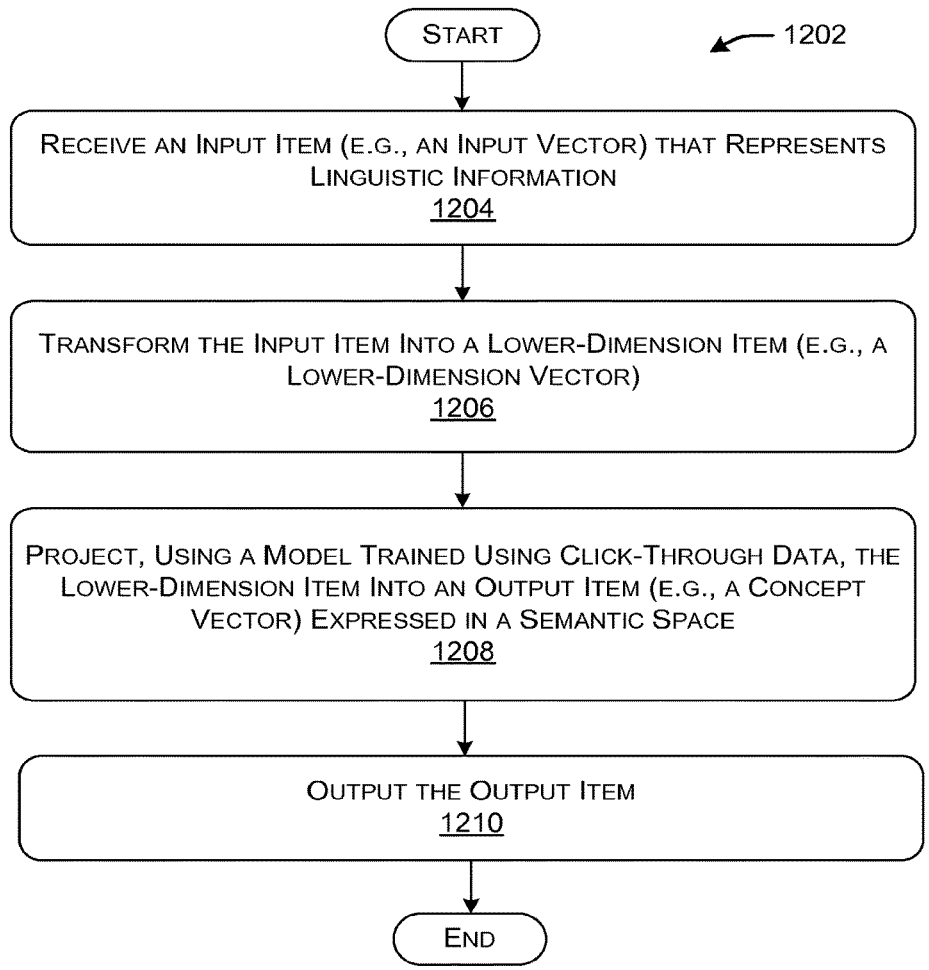
FIG. 12 is a flowchart that shows one illustrative manner of operation of a projection module, which is a component that initially appears in FIG. 3.

FIG. 12 shows a procedure 1202 that represents one manner of operation of the projection module 302 of FIG. 4. In block 1204, the dimensionality-reduction module (DRM) 306 receives an input item (e.g., an input vector) that represents linguistic information, such as a query or part of a document, etc. In block 1206, the DRM 306 transforms the input item into a lower-dimension item, e.g., by performing n-gram hashing, random projection, or some other technique to produce a lower-dimension vector. In block 1208, the deep-structured semantic module (DSSM) 308 projects, using the model 106, the lower-dimension item to an output item expressed in a semantic space. In block 1210, the DSSM 308 outputs the output item, e.g., by sending it to the similarity determination module 316 of FIG. 3.

Figure 13:
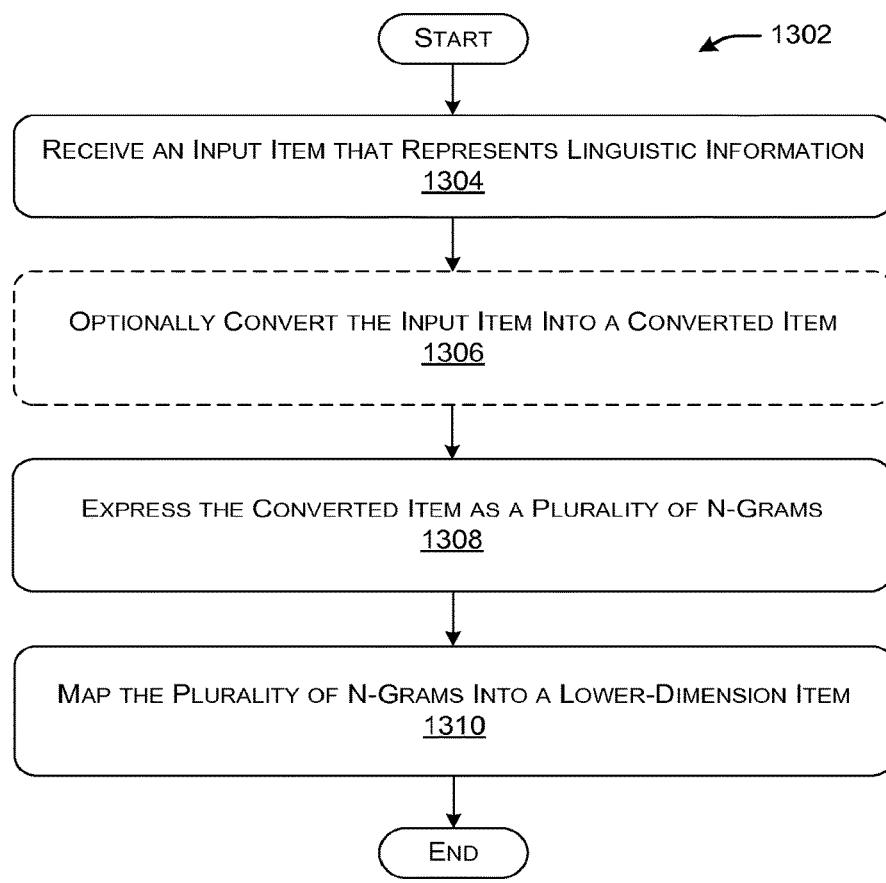
FIG. 13 is a flowchart that shows one illustrative manner of operation of a dimensionality-reduction module, which is a component that initially appears in FIG. 3.

FIG. 13 shows a procedure 1302 which explains one manner of operation of the DRM 306 of FIG. 4, which can be implemented using the functionality of FIG. 7 or 8, or some other functionality. In block 1304, the DRM 306 receives an input item that represents linguistic information, such as a query or part of a document. In block 1306, the DRM 306 optionally converts the input item into a converted item, such as by adding beginning and ending tokens to the word(s) associated with the input item, and/or converting the word(s) into their phonetic form. In block 1308, the DRM 306 expresses the information associated with the converted item as a plurality of n-grams. In block 1310, the DRM 306 maps the identified n-grams to counts in a lower-dimension item. Overall, the procedure 1302 shown in FIG. 13 can be performed with or without subsequently processing the lower-dimension item using the DSSM 308.

C. Representative Computing Functionality

FIG. 14 shows computing functionality 1402 that can be used to implement any aspect of the functionality of Sections A and B. For instance, the type of computing functionality 1402 shown in FIG. 14 can be used to implement the training system 104, and/or any component of the search engine 110 (such as the similarity determination system 116), and/or the user device 114, etc. In all cases, the computing functionality 1402 represents one or more physical and tangible processing mechanisms.

The computing functionality 1402 can include one or more processing devices 1404, such as one or more central processing units (CPUs), and/or one or more graphical processing units (GPUs), and so on.

The computing functionality 1402 can also include any storage resources 1406 for storing any kind of information, such as code, settings, data, etc. Without limitation, for instance, the storage resources 1406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1402. The computing functionality 1402 may perform any of the functions described above when the processing devices 1404 carry out instructions stored in any storage resource or combination of storage resources.

As to terminology, any of the storage resources 1406, or any combination of the storage resources 1406, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1402 also includes one or more drive mechanisms 1408 for interacting with any storage resource, such as a hard disk drive mechanism, an optical disk drive mechanism, and so on.

The computing functionality 1402 also includes an input/output module 1410 for receiving various inputs (via input devices 1412), and for providing various outputs (via output devices 1414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1416 and an associated graphical user interface (GUI) 1418. Other output devices include a printer, a model-generating mechanism, a tactile output mechanism, an archival mechanism (for storing output information), and so on. The computing functionality 1402 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area network, a wide area network (e.g., the Internet), point-to-point connections, etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure the privacy of user data maintained by the functionality, if any. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing device, the method comprising:
    obtaining a query comprising one or more words from a vocabulary having a first dimension;
    transforming the one or more words of the query into a phonetic representation of the one or more words;
    processing the phonetic representation to obtain a lower-dimension representation comprising a plurality of n-grams in an n-gram space having a second dimension that is smaller than the first dimension;
    performing a natural language processing operation on the lower-dimension representation, the natural language processing operation comprising determining similarity measures reflecting similarity of the one or more words of the query to a plurality of documents;
    based at least on the similarity measures, selecting a subset of the documents that are relevant to the query; and
    outputting the selected subset of documents in response to the query.

2. The method of claim 1, further comprising:
    receiving the query from a user device over a network; and
    in response to the query, sending search results identifying the selected subset of documents to the user device over the network.

3. The method of claim 1, further comprising:
    transforming the documents into other phonetic representations; and
    processing the other phonetic representations to obtain other lower-dimension representations of the documents,
    the natural language processing operation comprising:
        mapping the lower-dimension representation of the query and the other lower-dimension representations of the documents into a semantic space; and
        determining the similarity measures based at least on relative distances between the lower-dimension representation of the query and other lower-dimension representations of the documents in the semantic space.

4. The method of claim 3, wherein the one or more words are obtained as a bag-of-words representation of the query.

5. The method of claim 3, further comprising:
    training a semantic model to map the lower-dimension representation of the query and the other lower-dimension representations of the documents into the semantic space using click-through data reflecting user selections of various documents after submitting various queries.

6. The method of claim 1, wherein the processing comprises adding tokens to the phonetic representation, individual n-grams of the lower-dimension representation comprising individual tokens.

7. A system comprising:
    a processing device; and
    a computer readable storage medium storing instructions which, when executed by the processing device, cause the processing device to:
        obtain a query comprising one or more words from a vocabulary having a first dimension;
        transform the one or more words of the query into a phonetic representation of the query;
        process the phonetic representation of the query to obtain a lower-dimension representation of the query, the lower-dimension representation comprising a plurality of n-grams in an n-gram space having a second dimension that is smaller than the first dimension;
        use the lower-dimension representation to determine similarity measures reflecting similarity of the query to a plurality of documents;

based at least on the similarity measures, select a subset of the documents that are relevant to the query; and output the selected subset of documents in response to the query.

8. The system of claim 7, wherein the instructions, when executed by the processing device, cause the processing device to:

obtain click-through data reflecting user selections of various documents after submitting various queries;

transform the various documents and the various queries into various phonetic representations;

process the various phonetic representations of the various documents and the various queries to obtain various lower-dimension representations comprising various n-grams in the n-gram space; and train a semantic model using the click-through data to map the various lower-dimension representations into a semantic space.

9. The system of claim 8, wherein the instructions, when executed by the processing device, cause the processing device to:

transform the documents into other phonetic representations of the documents; and process the other phonetic representations of the documents to obtain other lower-dimension representations of the documents, map the lower-dimension representation of the query and the other lower-dimension representations of the documents into the semantic space using the semantic model; and determine the similarity measures based at least on relative distances between the lower-dimension representation of the query and other lower-dimension representations of the documents in the semantic space.

10. The system of claim 9, wherein the instructions, when executed by the processing device, cause the processing device to:

receive the query from a user device over a network; and in response to the query, send search results identifying the selected subset of documents to the user device over the network.

11. The system of claim 10, wherein the instructions, when executed by the processing device, cause the processing device to:

train the semantic model by iteratively adjusting model parameters of the semantic model to achieve an objective defined in an objective function.

12. The system of claim 11, wherein the objective function increases a conditional likelihood of clicked documents given respective queries.

13. The system of claim 12, wherein the objective function reduces a conditional likelihood of non-clicked documents given the respective queries.

14. A computer readable storage medium storing computer readable instructions which, when executed by one or more processing devices, cause the one or more processing devices to perform acts comprising:

obtaining a query comprising one or more words from a vocabulary having a first dimension;

transforming the query into a phonetic representation of query;

processing the phonetic representation to obtain a lower-dimension representation of the query, the lower-dimension representation comprising a plurality of n-grams in an n-gram space having a second dimension that is smaller than the first dimension;

using the lower-dimension representation of the query to determine similarity measures reflecting similarity of the query to a plurality of documents;

based at least on the similarity measures, selecting a subset of the documents that are relevant to the query; and outputting the selected subset of documents in response to the query.

15. The computer readable storage medium of claim 14, the acts further comprising:

transforming the documents into other phonetic representations of the documents;

processing the other phonetic representations to obtain other lower-dimension representations of the documents in the n-gram space; and using the other phonetic representations of the documents with the lower-dimension representation of the query to determine the similarity measures.

16. The computer readable storage medium of claim 15, the acts further comprising:

comparing the lower-dimension representation of the query directly to the other lower-dimension representations of the documents to determine the similarity measures.

17. The computer readable storage medium of claim 15, the acts further comprising:

adding a token to the beginning of the phonetic representation of the query to obtain the lower-dimension representation of the query; and adding the token to the beginning of the other phonetic representations of the documents to obtain the other lower-dimension representations of the documents.

18. The computer readable storage medium of claim 17, the acts further comprising:

adding the token to the end of the phonetic representation of the query to obtain the lower-dimension representation of the query; and adding the token to the end of the other phonetic representations of the documents to obtain the other lower-dimension representations of the documents.

19. The computer readable storage medium of claim 18, the similarity measures being determined using the phonetic representation of the query having the token added to the beginning and the end of the phonetic representation, and the other phonetic representations of the documents having the token added to the beginning and the end of the other phonetic representations.

20. The computer readable storage medium of claim 19, the token being a character other than a letter.

* * * * *